United States Patent [19]

Ruys et al.

[11] 4,355,405

[45] Oct. 19, 1982

[54] DIGITAL SIGNALLING SYSTEM

[75] Inventors: Willi A. H. Ruys, Wilrijk; Dermod J. K. O'Reilly, Antwerp; Leopold P. Verbist, St. Katelijne Waver; Daniel S. G. Hoefkens, Berchem; Guido M. J. B. Thyssens, Boechout, all of Belgium

[73] Assignee: International Standard Electric Corporation, New York, N.Y.

[21] Appl. No.: 143,055

[22] Filed: Apr. 23, 1980

[30] Foreign Application Priority Data

Apr. 27, 1979 [NL] Netherlands .......................... 7903346

[51] Int. Cl.³ ............................................. H04J 5/06
[52] U.S. Cl. ........................................ 375/48; 375/89; 179/84 VF; 364/724
[58] Field of Search ...................... 375/24, 48, 96, 103, 375/25; 179/84 VF; 328/167, 137, 138; 340/170, 171; 364/572, 724

[56] References Cited

U.S. PATENT DOCUMENTS

| | | | |
|---|---|---|---|
| 3,150,232 | 9/1964 | Schmidt | 179/84 |
| 3,436,487 | 4/1969 | Blane | 179/84 VF |
| 3,863,030 | 1/1975 | Mills | 179/84 VF |
| 3,909,549 | 9/1975 | Tarridec | 179/84 VF |

FOREIGN PATENT DOCUMENTS

| | | | |
|---|---|---|---|
| 7120613 | 6/1971 | France | 179/84 VF |
| 7503125 | 1/1975 | France | 179/84 VF |
| 7737621 | 12/1976 | France | 375/76 |

OTHER PUBLICATIONS

IEEE Transaction on Audio, vol. AU-16, No. 3, Sep. 1968, L. B. Jackson, An Approach to the Implementation of Digital Filters, pp. 413–421.
IEEE Transaction on Acoustics, vol. ASSP-23, No. 3, Jun. 1975, F. G. Braun, Non-Recursive Filters for Detecting MF Signals, pp. 250–256.
Electrical Communication, vol. 54, No. 41979, (London), G. Thysseus, Digital MF Receivers and Senders.
IEEE Transaction on Communication, vol. COM-21, No. 12, Dec. 1973, I. Koval, Digital MF Filter Using Discrete Fourier Transform, pp. 1331–1335.
The Bell System Technical Journal, vol. 55, No. 4, Apr. 1976, Giopinath and Kurshan, A Touch Tone Receiver-Generator with Digital Channel Filter.
Electrical Communication, vol. 54, No. 4, 1979, Thysseus and Verbist, Digital Multifrequency Receiver and Senders.

*Primary Examiner*—Benedict V. Safourek
*Assistant Examiner*—Stephen Chin
*Attorney, Agent, or Firm*—James B. Raden; Marvin M. Chaban

[57] ABSTRACT

A digital MFC receiver using single band and multiband filters. The single band filters are tuned to respective ones of the signal frequencies. The multiband filters are used as guard filters producing interleaved guard bands between the signalling frequencies. A processor is used to test and evaluate received signals, the processor being programmable to evaluate signals to different specifications.

35 Claims, 28 Drawing Figures

| F=k x | 0 | 1 | 2 | 3 | 4 | 5 | 6 | 7 | | 124 | 125 | 126 | 127 |
|---|---|---|---|---|---|---|---|---|---|---|---|---|---|
| k, 0 | 0 64 | 1 65 | 2 66 | 3 67 | 4 68 | 5 69 | 6 70 | 7 71 | | 124 60 | 125 61 | 126 62 | 127 63 |
| k, 1 | 124 60 | 125 61 | 126 62 | 127 63 | 0 64 | 1 65 | 2 66 | 3 67 | | 120 56 | 121 57 | 122 58 | 123 59 |
| k, 2 | 120 56 | 121 57 | 122 58 | 123 59 | 124 60 | 125 61 | 126 62 | 127 63 | | 116 52 | 117 53 | 118 54 | 119 55 |
| k, 3 | 116 52 | 117 53 | 118 54 | 119 55 | 116 52 | 117 53 | 118 54 | 115 51 | | 112 48 | 113 49 | 114 50 | 115 51 |
| k, 4 | 112 48 | 113 49 | 114 50 | 111 47 | 112 48 | 113 49 | 114 50 | 111 47 | | 108 44 | 109 45 | 110 46 | 111 47 |
| k, 5 | 108 44 | 109 45 | 110 46 | 107 43 | 108 44 | 109 45 | 110 46 | 107 43 | | 104 40 | 105 41 | 106 42 | 107 43 |
| k, 6 | 104 40 | 105 41 | 106 42 | 103 39 | 104 40 | 105 41 | 106 42 | 103 39 | | 100 36 | 101 37 | 102 38 | 103 39 |
| k, 7 | 100 36 | 101 37 | 102 38 | 99 35 | 100 36 | 101 37 | 102 38 | 99 35 | | 96 32 | 97 33 | 98 34 | 99 35 |
| k, 8 | 96 32 | 97 33 | 98 34 | 95 31 | 96 32 | 97 33 | 98 34 | 95 31 | | 92 28 | 93 29 | 94 30 | 95 31 |
| k, 9 | 92 28 | 93 29 | 94 30 | 91 27 | 92 28 | 93 29 | 94 30 | 91 27 | | 88 24 | 89 25 | 90 26 | 91 27 |
| k, 10 | 88 24 | 89 25 | 90 26 | 87 23 | 88 24 | 89 25 | 86 22 | 87 23 | | 84 20 | 85 21 | 86 22 | 87 23 |
| k, 11 | 84 20 | 85 21 | 86 22 | 83 19 | 84 20 | 85 21 | 82 18 | 83 19 | | 80 16 | 81 17 | 82 18 | 83 19 |
| k, 12 | 80 16 | 81 17 | 82 18 | 79 15 | 80 16 | 81 17 | 78 14 | 79 15 | | 76 12 | 77 13 | 78 14 | 79 15 |
| k, 13 | 76 12 | 77 13 | 78 14 | 75 11 | 76 12 | 77 13 | 74 10 | 75 11 | | 72 8 | 73 9 | 74 10 | 75 11 |
| k, 14 | 72 8 | 73 9 | 74 10 | 71 7 | 72 8 | 73 9 | 70 6 | | | 68 4 | 69 5 | 70 6 | 71 7 |
| k, 15 | 68 4 | 69 5 | 70 6 | | | | | | | 64 0 | 65 1 | 66 2 | 67 3 |

FIG.6

| | |
|---|---|
| 0 | $C_0^0$ |
| 1 | $H_0^0$ |
| 2 | $C_0^1$ |
| 3 | $H_0^1$ |
| 4 | $C_0^2$ |
| 5 | $H_0^2$ |
| 6 | $C_0^3$ |
| 7 | $H_0^3$ |
| 8 | $C_0^4$ |
| 9 | $H_0^4$ |
| 10 | $C_0^5$ |
| 11 | $H_0^5$ |
| 12 | $C_0^6$ |
| 13 | $H_0^6$ |
| 14 | $C_0^7$ |
| 15 | $H_0^7$ |

| | |
|---|---|
| 17 | $C_{64}^0$ |
| 18 | $H_{64}^0$ |
| 19 | $C_{64}^1$ |
| 20 | $H_{64}^1$ |
| 21 | $C_{64}^2$ |
| 22 | $H_{64}^2$ |
| 23 | $C_{64}^3$ |
| 24 | $H_{64}^3$ |
| 25 | $C_{64}^4$ |
| 26 | $H_{64}^4$ |
| 27 | $C_{64}^5$ |
| 28 | $H_{64}^5$ |
| 29 | $C_{64}^6$ |
| 30 | $H_{64}^6$ |
| 31 | $C_{64}^7$ |
| 32 | $H_{64}^7$ |

$\boxed{{}_{64}^{0}}$

FIG. 7

| # | Col 1 (1a) |
|---|---|
| 1 | $C_0^0 x_{0,0} + C_1^0 x_{1,0} + \cdots + C_{127}^0 x_{127,0}$ |
| 2 | $H_0^0 x_{0,0} + H_1^0 x_{1,0} + \cdots + H_{127}^0 x_{127,0}$ |
| 3 | $\sum_0^{127} C_k^1 x_{k,0}$ |
| 4 | $\sum_0^{127} H_k^1 x_{k,0}$ |
| 5 | $\sum_0^{127} C_k^2 x_{k,0}$ |
| 6 | $\sum_0^{127} H_k^2 x_{k,0}$ |
| 7 | $\sum_0^{127} C_k^3 x_{k,0}$ |
| 8 | $\sum_0^{127} H_k^3 x_{k,0}$ |
| 9 | $C^4$ |
| 10 | $H^4$ |
| 11 | $C^5$ |
| 12 | $H^5$ |
| 13 | $C^6$ |
| 14 | $H^6$ |
| 15 | $C^7$ |
| 16 | $H^7$ |

| | | |
|---|---|---|
| 1 | 1a | $\sum_0^{127} C_k^i x_{k,0}$ |
| | | $\sum_0^{127} H_k^i x_{k,0}$ |
| | 1b | $\sum_0^{127} C_k^i x_{k+64,0}$ |
| | | $\sum_0^{127} H_k^i x_{k+64,0}$ |
| 2 | 2a | $\sum_0^{127} C_k^i x_{k+4,1}$ |
| | | $\sum_0^{127} H_k^i x_{k+4,1}$ |
| | 2b | $\sum_0^{127} C_k^i x_{k+68,1}$ |
| | | $\sum_0^{127} H_k^i x_{k+68,1}$ |
| 3 | 3a | $x_{k+8,2}$ |
| | 3b | $x_{k+72,2}$ |
| 16 | 16a | $x_{k+60,15}$ |
| | 16b | $x_{k+124,15}$ |

| BLN | F | CHO | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 0 | 0/3 | A | B̄ | C̄ | D̄ | Ē | F̄ | Ḡ | H̄ | Ī | J̄ | K̄ | L̄ | M̄ | N̄ | Ō | P̄ |
| 1 | 4/7 | P | A | B̄ | C̄ | D̄ | Ē | F̄ | Ḡ | H̄ | Ī | J̄ | K̄ | L̄ | M̄ | N̄ | Ō |
| 2 | 8/11 | O | P | A | B̄ | C̄ | D̄ | Ē | F̄ | Ḡ | H̄ | Ī | J̄ | K̄ | L̄ | M̄ | N̄ |
| 3 | 12/15 | N | O | P | A | B̄ | C̄ | | | | | | | | L̄ | M̄ |
| 4 | 16/19 | M | N | O | | A | B̄ | | | | | | | | | | L̄ |
| ... | ... | | | | | | | | | | | | | | | | |
| 14 | 56/59 | | | | | | | | | | | | | | P | A | B̄ |
| 15 | 60/63 | B | C | D | E | F | G | H | I | J | K | L | M | N | O | P | A |
| 0 | 64/67 | Ā | B | C | | | | | | | | | | | N | O | P |
| 1 | 68/71 | P̄ | Ā | B | C | | | | | | | | | | | N | O |
| 2 | 72/75 | Ō | P̄ | Ā | | | | | | | | | | | | | N |
| ... | ... | | | | | | | | | | | | | | | | |
| 15 | 124/127 | B̄ | C̄ | D̄ | Ē | F̄ | Ḡ | H̄ | Ī | J̄ | K̄ | L̄ | M̄ | N̄ | Ō | P̄ | Ā |

|   | 0 | 512 | 1024 | 1536 |   |
|---|---|---|---|---|---|
|  | 60 / 124 | 61 / 125 | 62 / 126 | 63 / 127 |  |
|  | 56 / 120 | 57 / 121 | 58 / 122 | 59 / 123 |  |
|  | 52 / 116 | 53 / 117 | 54 / 118 | 55 / 119 |  |
|  | 48 / 112 | 49 / 113 | 50 / 114 | 51 / 115 |  |
|  | 44 / 108 | 45 / 109 | 46 / 110 | 47 / 111 |  |
|  | 40 / 104 | 41 / 105 | 42 / 106 | 43 / 107 |  |
|  | 36 / 100 | 37 / 101 | 38 / 102 | 39 / 103 |  |
|  | 32 / 96 | 33 / 97 | 34 / 98 | 35 / 99 |  |
|  | 28 / 92 | 29 / 93 | 30 / 94 | 31 / 95 |  |
|  | 24 / 88 | 25 / 89 | 26 / 90 | 27 / 91 |  |
|  | 20 / 84 | 21 / 85 | 22 / 86 | 23 / 87 |  |
|  | 16 / 80 | 17 / 81 | 18 / 82 | 19 / 83 |  |
|  | 12 / 76 | 13 / 77 | 14 / 78 | 15 / 79 |  |
|  | 8 / 72 | 9 / 73 | 10 / 74 | 11 / 75 |  |
|  | 4 / 68 | 5 / 69 | 6 / 70 | 7 / 71 |  |
|  | 0 / 64 | 1 / 65 | 2 / 66 | 3 / 67 |  |
|   | 511 | 1023 | 1535 | 2047 |   |

Side column: B, C, D, E, F, G, H, I, J, K, L, M, N, O, P, A

FIG. 25

| BLN. | 0 | | | 1 | | | ... | 31 | | |
|---|---|---|---|---|---|---|---|---|---|---|
| F=k \ x | 0 | 1 | 2 | 3 | 4 | 5 | | | | |
| k,0 | 0 | 1 | 2 | 3 | 4 | 5 | ... | | | |
| k,1 | 48 | 49 | 50 | 51 | 52 | 53 | ... | 93 | 94 | 95 |
| k,2 | 93 | 94 | 95 | 0 | 1 | 2 | ... | 45 | 46 | 47 |
| k,3 | 90 | 91 | 92 | 93 | 94 | 95 | ... | 42 | 43 | 44 |
| k,4 | 87 | 88 | 89 | 90 | 91 | 92 | ... | 39 | 40 | 41 |
| k,5 | 84 | 85 | 86 | | | | | | | |
| k,6 | 81 | 82 | 83 | | | | | | | |
| k,7 | 78 | 79 | 80 | | | | | | | |
| k,8 | 75 | 76 | 77 | | | | ... | | | |
| k,9 | 72 | 73 | 74 | | | | | | | |
| k,10 | 69 | 70 | 71 | | | | | | | |
| k,11 | 66 | 67 | 68 | | | | | | | |
| k,12 | 63 | 64 | 65 | | | | | | | |
| k,13 | 60 | 61 | 62 | | | | | | | |
| k,14 | 57 | 58 | 59 | | | | | | | |
| k,15 | 54 | 55 | 56 | | | | | | | |
| | 51 | 52 | 53 | 54 | 55 | 56 | | 48 | 49 | 50 |
| | 3 | 4 | 5 | 6 | 7 | 8 | | 0 | 1 | 2 |

FIG. 27

|   | 0 | 512 | 1024 |   |
|---|---|---|---|---|
|   | 45 93 | 46 94 | 47 95 |   |
|   | 42 90 | 43 91 | 44 92 |   |
|   | 39 87 | 40 88 | 41 89 |   |
|   | 36 84 | 37 85 | 38 86 |   |
|   | 33 81 | 34 82 | 35 83 |   |
|   | 30 78 | 31 79 | 32 80 |   |
|   | 27 75 | 28 76 | 29 77 |   |
|   | 24 72 | 25 73 | 26 74 |   |
|   | 21 69 | 22 70 | 23 71 |   |
|   | 18 66 | 19 67 | 20 68 |   |
|   | 15 63 | 16 64 | 17 65 |   |
|   | 12 60 | 13 61 | 14 62 |   |
|   | 9 57 | 10 58 | 11 59 |   |
|   | 6 54 | 7 55 | 8 56 |   |
|   | 3 51 | 4 52 | 5 53 |   |
|   | 0 48 | 1 49 | 2 50 |   |
|   | 511 | 1023 | 1535 |   |

FIG. 28

DIGITAL SIGNALLING SYSTEM

The invention relates to a digital signalling system including sender means which are coupled to receiver means via transmission means and which are adapted to generate at least one frequency signal, said receiver means being adapted to recognize the presence of said frequency signal received and being provided with guard means to protect said receiver against the reception of spurious signals.

Such a signalling system and more particularly such a digital receiver adapted to recognize the presence of a combination of two-frequency signals out of six-frequency signals is known from the article "Digital MF receiver using discrete Fourier Transform" by I. Koval and G. Gara, published in the IEEE Transactions of Communications, Vol. COM-21, No. 12, December 1973, pages 1331 to 1335. This multi-frequency receiver includes six digital bandpass filters each tuned to a different frequency of said six-frequency signals, a recognition logic to recognize said combinations of two signals, a timer circuit to accept such a combination when it is present during a predetermined time interval and a guard circuit to protect the receiver against faulty operation due to the presence of noise signals. The guard action consists in evaluating the signal to noise power ratio, where the signal power is the combined power of the two frequency signals and the noise power is the difference between the total power of signals received and the above combined power.

Should such a receiver be used in MFC compelled signalling as described in the article "Interregister multi-frequency code signalling for telephone switching in Europe" by M. Den Hertog (Electrical Communication Vol. 38, No. 1, 1963, pages 130 to 164), a receiver provided with such a guard means will not operate properly. Indeed, when in a two-wire multi-frequency signalling equipment a receiver at the receiving side has recognized a digit, its sender sends back signals to the emitting side so that at this moment both forward and backward signals are present. These forward signals still present will be interpreted by the receiver on the emitting side as noise since it has to recognize only backward signals. Consequently, the noise power content will be increased, when these forward signals are larger in amplitude than the backward signals, the receiver at the emitting side will not be able to recognize these backward signals so that its sender cannot be blocked. Moreover, the receiver must be protected against imitations which may occur at the reception of a single frequency signal which the receiver may recognize as a two-out-of-six code. Indeed, when such a signal has a frequency situated between two nominal frequency values, each of the two filters having neighbouring pass bands centered around the above nominal frequencies may supply an output within the specified range having a signal to noise ratio which is smaller than the specified 3 dB, where it is supposed that the noise power is constituted by the difference between the total power of the received frequency signal and the combined power of the filter output results. It is evident that in this case the guard circuit is ineffective.

It is an object of the invention to provide a system and more particularly a receiver of the above type including means to protect said receiver against faulty operation due to the reception of said single frequency signal and spurious signals.

The present system is characterized in that said receiver means includes filter means including at least one multiband digital filter, a number of said bands being used as guard bands forming said guard means.

Usually, said digital signalling system is used in a multiplexed fashion, said receiver being shared between a number of multiplexed channels, (e.g. PCM). Such a system and more particularly such a multiplexed multifrequency receiver is known from the article "An Approach of the Implementation of Digital Filters" by L. G. Jackson, J. F. Kaiser, H. S. McDonald, published in the IEEE Transactions on Audio and Electroacoustics, Vol. AU-16, No. 3, September 1968, pages 413 to 421. Therein, a block diagram of an experimental digital TTR (Touch-Tone Receiver) is shown on page 419 (FIG. 14). This receiver which is a straightforward version of the analog receiver described in the article "Signalling System and Receiver for Touch-Tone Calling" by R. N. Battista et al (published in the IEEE Trans. on Communications and Electronics, Vol. 82 pages 9–17, March 1963) is able to recognize one frequency out of each of two groups of frequencies which are situated in the voice frequency band. This receiver includes multiplexed digital filters such as high-pass, band rejection and band-pass filters. To protect the receiver against faulty operation due to the presence of spurious signals such as noise or voice signals other then signalling frequencies a guard action is provided by using limiter circuits.

The invention also relates to a digital signalling system including sender means coupled to receiver means and adapted to generate at least one sampled frequency signal, the sample values of which are coded according to a PCM compressed logarithmic law, said receiver means including at least one digital filter system and being adapted to recognize the presence of this signal, said digital filter system including storage means to store coded logarithmic values of filter parameters.

Such a signalling system and more particularly such a digital receiver adapted to recognize a number n of frequency signals out of another number m of frequency signals, e.g. a two-out-of six code, is known from the US Pat. No. 3 863 030. The filter system described therein makes use of Fourier Transforms to evaluate the presence of n, e.g. 2 frequency signals out of the m signals. Such a method is also described on pages 1331, 1332 of the above mentioned article by I. Koval and G. Gara. Instead of multiplying the linear value of the input samples with the sine and cosine values of the product of the angular frequencies of the signals to be recognized by a multiple of the sampling time interval and to sum these partial products for a number of samples, in the receiver of the above US patent coded logarithmic values of the sine and cosine values are added to the input samples coded according to PCM compressed $\mu$-law. This necessarily introduces errors due to the fact that part from quantization, the compression characteristic has a number of linear segments. Indeed, such a characteristic is different from a pure logarithmic curve passing through the discontinuity points of the linear segment curve so that mathematically speaking an error is introduced due to the difference between a value on the compression characteristic and a pure logarithmic value and this for the same linear value.

In a subsequent U.S. Pat. No. 3 824 471 of the same assignee as U.S. Pat. No. 3 863 030, it is noted that the latter assumes an ideal logarithmic compression function, which is only approximately correct for same systems and therefore lead to a small error tolerable in most instances. In this later U.S. Pat. No. 3 824 471, no use is made of logarithmic conversions.

It is a further object of the invention to provide a system which still makes use of logarithmic conversions but wherein it is believed the above mentioned errors have been minimised.

The present system is characterized in that said filter system further includes means (MEl) to convert said coded sample values into coded pure logarithmic values.

Another characteristic of the invention is that said converting means (MEl) is a memory means to store said pure logarithmic values and that it further includes an input register (RO) to successively store said coded input sample values and an adder (AD1) to successively add said logarithmic values of said filter parameters read out from said storage means (CB) and said pure logarithmic values read out from said memory means, e.g. a Read-Only Memory, which is coupled between said input register and said adder.

A further characteristic of the invention is that each of said pure logarithmic values are stored in a different location of said memory means (MEl) at an address equal to the corresponding coded input sample value.

In this way by addressing the memory means for instance by a seven bit word which is the coded sample value, 128 corresponding pure logarithmic values may be read out.

A still further characteristic of the invention is that both said logarithmic values stored in said memory means (MEl) and said storage means (CB) are defined by the same logarithmic function.

The above logarithmic function y is $$y = 128 \log_{256} 256^2 w$$

wherein w is the normalised linear value of the filter parameters (filter coefficients) or of the input samples. This function y is derived from the function $$y' = 128 \log_{256} 256 w$$

by shifting the curve representing this function upwards over an amount of 128. Indeed, $$y = y' + 128 = 128 \, (\log_{256} 256 \, w + \log_{256} 256)$$

The curve representing the function y' passes through the discontinuity points of the linear segmented compression characteristic and through the point ($w = (1/256)$, $y = 0$), The pre-computed values of y are coded and stored in the memory means (MEl) and the storage means (CB). To pre-compute y, the 128 values are decoded into linear values as explained in the descriptive part.

It should be noted that with a factor $256^2$ for w, this means that y can remain positive since $y = 0$ corresponds to $w = (1/256^2)$ which is an sufficiently small value to be able to neglect samples of smaller values.

In the preferred embodiments, the receiver of the signalling system includes 8 multiplexed linear phase non recursive digital filters and 8 homologue Hilbert transformers and works in a time division multiplex fashion for 16 input channels. Six of the eight pairs of filters are tuned to a different one of six signalling frequencies. The two remaining pairs are guard filters of the multi-band type. The five guard bands between the six signalling frequencies are produced by two interleaved multi-band guard filters. The receiver further includes a micro-processor with the necessary memories to carry out the different tests and evaluations needed and which may be programmed to evaluate signals according to different signalling specifications.

The above mentioned and other objects and features of the invention will become more apparent and the invention itself will be best understood by referring to the following description of embodiments taken in conjunction with the accompanying drawings in which:

FIG. 6 is a convolution table showing in an abbreviated way the convolution of the input samples with filter coefficients of a digital filter forming part of the receiver of FIG. 3;

FIG. 7 shows the way of storing filter coefficient values in a memory part of a filter coefficient memory or coefficient bank of the digital filter of the receiver of FIG. 3;

FIG. 9 shows filter results stored in an accumulator forming part of the receiver of FIG. 3;

FIG. 24 is the convolution table of FIG. 6 shown in an abbreviated way;

FIG. 25 is a configuration table showing in an abbreviated manner the way of storing the filter coefficients in the coefficient bank part of which is shown in FIG. 7;

FIG. 27 is a convolution table similar to that of FIG. 6;

FIG. 28 is a configuration table similar to that of FIG. 25.

Although the multi-frequency receiver system more particularly the multi-frequency receiver which is described in detail later, relates to a receiver to recognize signals according to the signalling system R2, the receiver has been universally designed in such a way that it can be adapted to receive signals according to other signalling systems such as R1, system No. 5, push button etc. Therefore, the receiver is provided with a microprocessor which can be programmed to interpret and process filter results according to different signalling systems. For these signalling systems reference is made to the different CCITT specifications. The specifications concerning R2 interregister signalling can be found in the orange book (Sixth Plenary Assembly Geneva, 27 Sep., 8 Oct. 1976) Volume V13, and those concerning No 5 and No 5 bis register signalling are to be found in the green book (Fifth Plenary Assembly Geneva, 4-15, December 1970) Volume Vi-2.

It is recalled that in case of interregister compelled signalling according to the R2 specifications, combinations of two frequency signals (sine waves) out of six frequency signals are used to represent digits or other conditions to be transmitted. In this compelled signalling system, wherein a receiver acknowledges receipt of frequency signals, two frequencies out of six signals from a higher group ranging from 1380 Hz to 1980 Hz and two signals out of six signals from a lower group ranging from 540 Hz to 1140 Hz are used to transmit and acknowledge the receipt of digits as described in the article "Interregister multi-frequency code signalling for telephone switching in Europe" by M. den Hertog lpublished on pages 130 to 164 in Electrical Communication, Vol. 38, No 1, 1963.

In the case of voice frequency push button signalling from a calling subscriber to an exchange one frequency out of each of two groups ranging from 697 to 941 Hz and from 1209 to 1633 Hz is used.

In PCM the above composite frequency signals are sampled at 8 KHz and encoded. Different composite signals belonging to different channels are sampled at the same sample frequency and are multiplexed to form for instance a 125 microsecond frame having 64 time slots, each time slot belonging to a predetermined channel.

Figure 1:
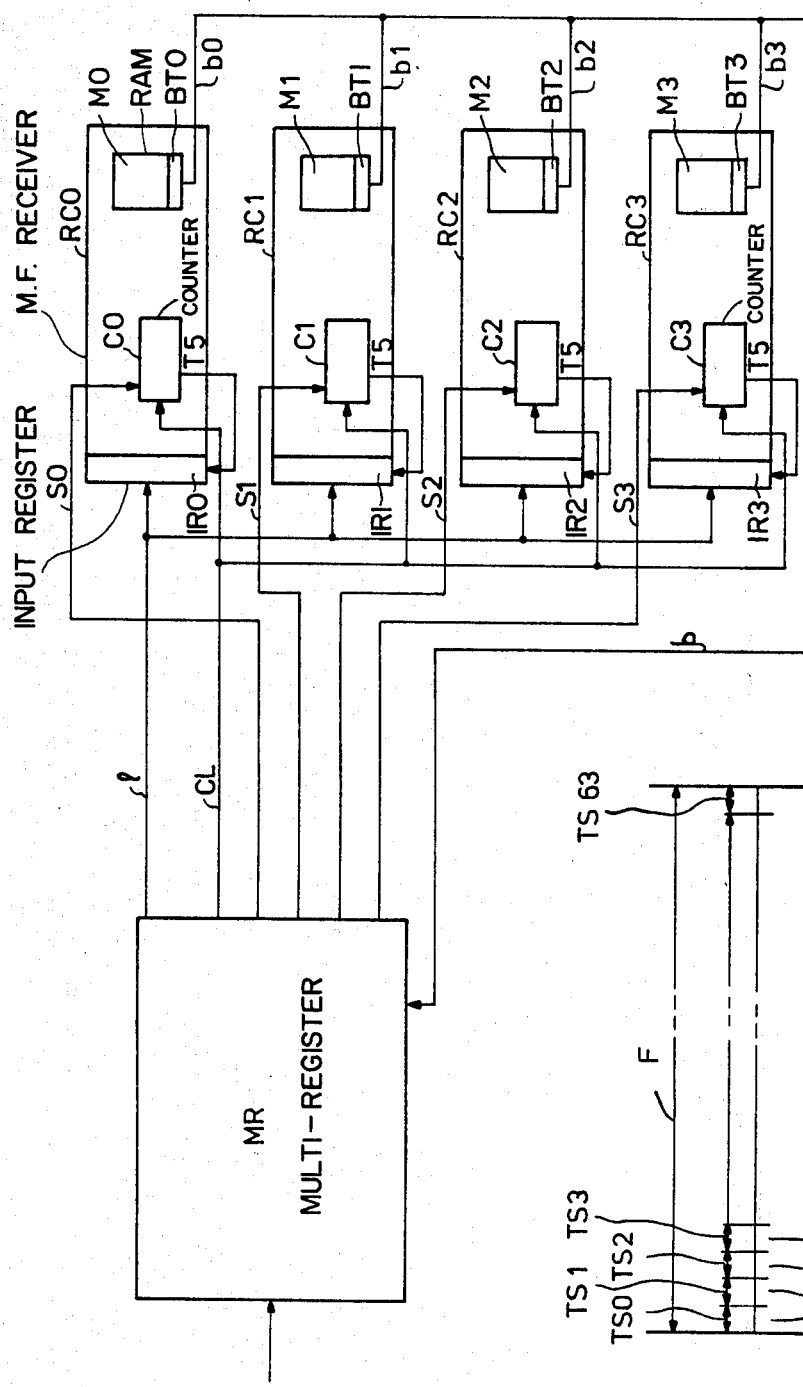
FIG. 1 is an overall block diagram of a 64 channel multi-frequency receiver system including four receivers each able to handle 16 channels according to the present invention.
Figure 2:
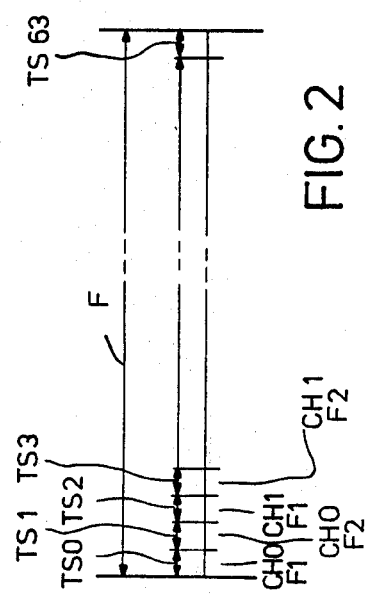
FIG. 2 is a timing diagram relative to the multi-frequency receiver of FIG. 1.

Referring to FIG. 1 the multi-frequency receiver system shown therein includes a multiregister MR and four multi-frequency receivers RC0 to RC63. This multiregister receives two groups of 32 multiplexed channels and transforms these channels into a 64-channel multiplexed one. FIG. 2 represents a time frame F of 125 microseconds divided into 64 time slots TS0 to TS3 of 1.95 microseconds, each one of which is alloted to a different channel of the 64 channels. To produce these 64 multiplexed channels the two time frames F1 and F1 (each having 32 time slots TS0 to TS31) of the two incoming 32 multiplexed channels are shifted over half a time slot interval (3.9/2 microseconds) with respect to each other and each incoming coded sample train of eight serial bits are transformed into eight parallel bits. In this way a time frame F is obtained having time slots TS0 to TS63 as shown on FIG. 2. These time slots TS0, TS1, TS2, TS3 . . . TS63 correspond to time slots TS0 (CH0) of frame F1, TS0 (CH0) of frame F2, TS1 (CH1) of frame F1, TS1 (CH1) of frame F2 . . . , TS31 (CH31) of frame F2 respectively. A parallel bit stream is thus produced and is sent over parallel wires 1 (represented by one line only) to the four receivers RC0 to RC3 which are all connected in parallel. Each sample is coded by means of eight bits, a seven bits magnitude and one sign bit. The samples are received by the different receivers RC0 to RC3 as shown in the following table

| samples in time slot | received by receiver |
|---|---|
| 0, 4, 8, 12, . . . 60 | RC0 |
| 1, 5, 9, 13, . . . 61 | RC1 |
| 2, 6, 10, 14, . . . 62 | RC2 |
| 3, 7, 11, 15, . . . 63 | RC3 |

The time interval between two succeeding samples received by a receiver is thus 7.8 (1.95×4) microseconds. In order to receive the input samples in the above order synchronizing pulses Si (i=0 to 3) are sent to the corresponding receivers RC0 to RC3 synchronizing the corresponding counter Ci (i=0 to 3) therein respectively. The synchronizing pulses Si which are repeated every 8 milliseconds are shifted with respect to a preceding train S(i−1) by 1.95 microseconds. The sample values corresponding with Si are clocked into a corresponding input register IRi by means of a 7.8 microseconds period pulse available at the T5 counter output and remain in this register during this time interval. This counter has a number of other outputs as will be shown later. Each receiver further includes an output buffer which are each constituted by a random access memory (M0 to M3) and tristate output buffer (BT0 to BT3). Each random access memory has 16 locations of at least 5 bits to store the computed received digits of the 16 channels (4 digit bits and 1 presence bit). Each of these locations of a receiver memory is updated every 16×4 frames time intervals (every 8 milliseconds) the updating of two succeeding locations belonging to two succeeding channels treated by the receiver being substantially separated by 4 frame time intervals, since the receiver needs a 4 frame time interval to compute a result for each channel, as explained later. However, all 16 locations of each memory M0 to M3 are read out synchroneously during a frame time interval of 125 microseconds (a location read out every 7.8 microseconds) and are stored in the corresponding tristate buffer. Each of the tristate buffers which are all connected in parallel to the same bus b is enabled every 7.8 microseconds during substantially 1.9 microseconds (enabling shown on FIG. 3 via AND-gate AND 45). This enabling time interval may not exceed 1.95 microseconds since an output result from the 4 receivers is wanted at the same rate as the input samples are fed thereto, i.e. every 1.95 microseconds. The enabling time interval between buffers Ti and Ti+1 being also 1.95 microseconds, the 64 information of the 64 channels are thus transferred in succession and in the right order (channel 0 to 64) from the receivers to the multiregister MR via b.

Figure 3:
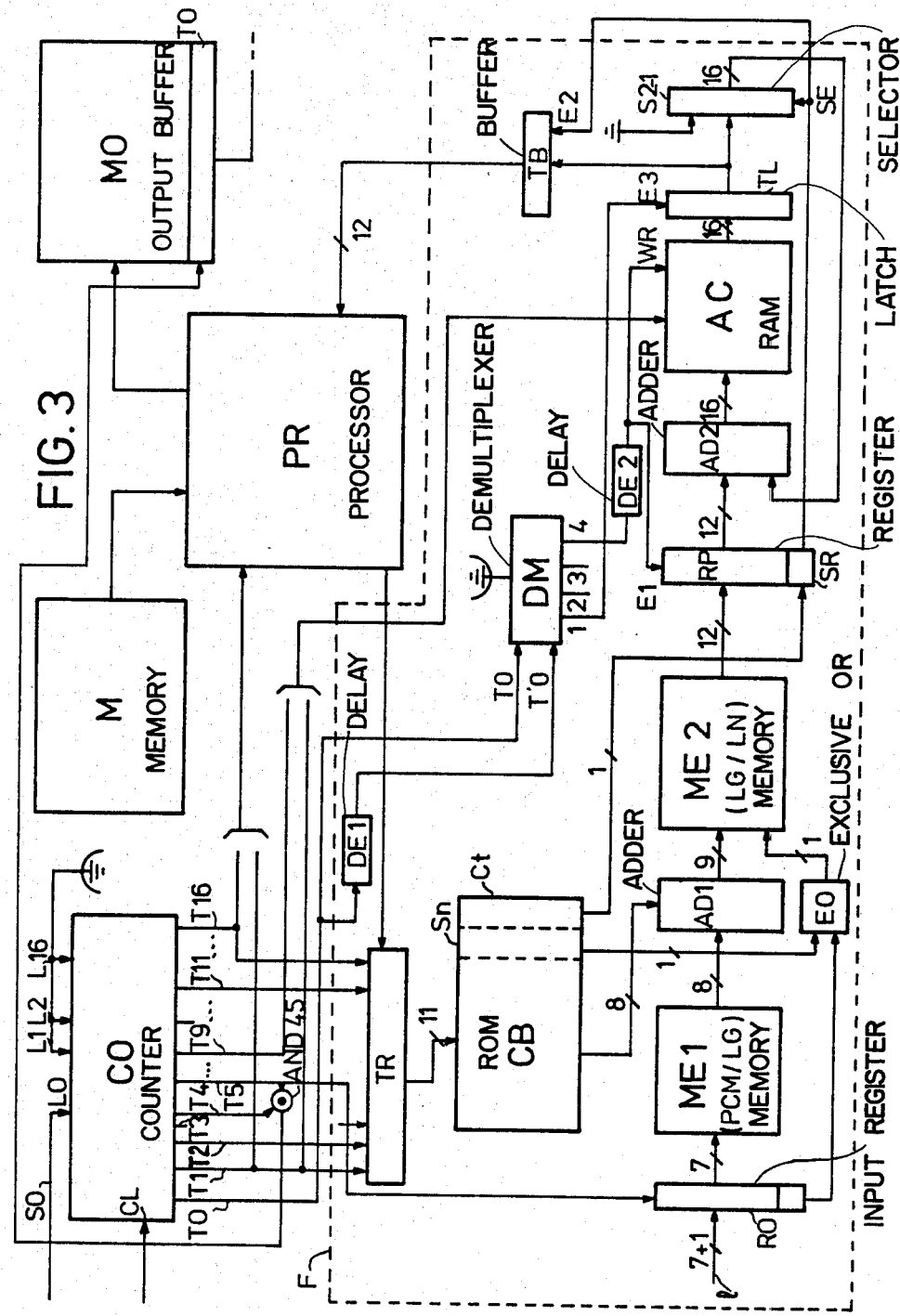
FIG. 3 is a block diagram of one of the four 16 channel multiplexed receivers shown in FIG. 1.

The multifrequency receiver RC0 the operation of which is similar to that of the other receivers RC1 to RC3 and which is shown on FIG. 3 mainly includes a filter system including itself a digital filter part F and a counter CO to supply the necessary pulses to this filter part, a processor PR with its associated memories M to process filter results supplied by the filter part F and an output buffer MO to store the results from the processor PR before being transferred to the multiregister.

Figure 4:
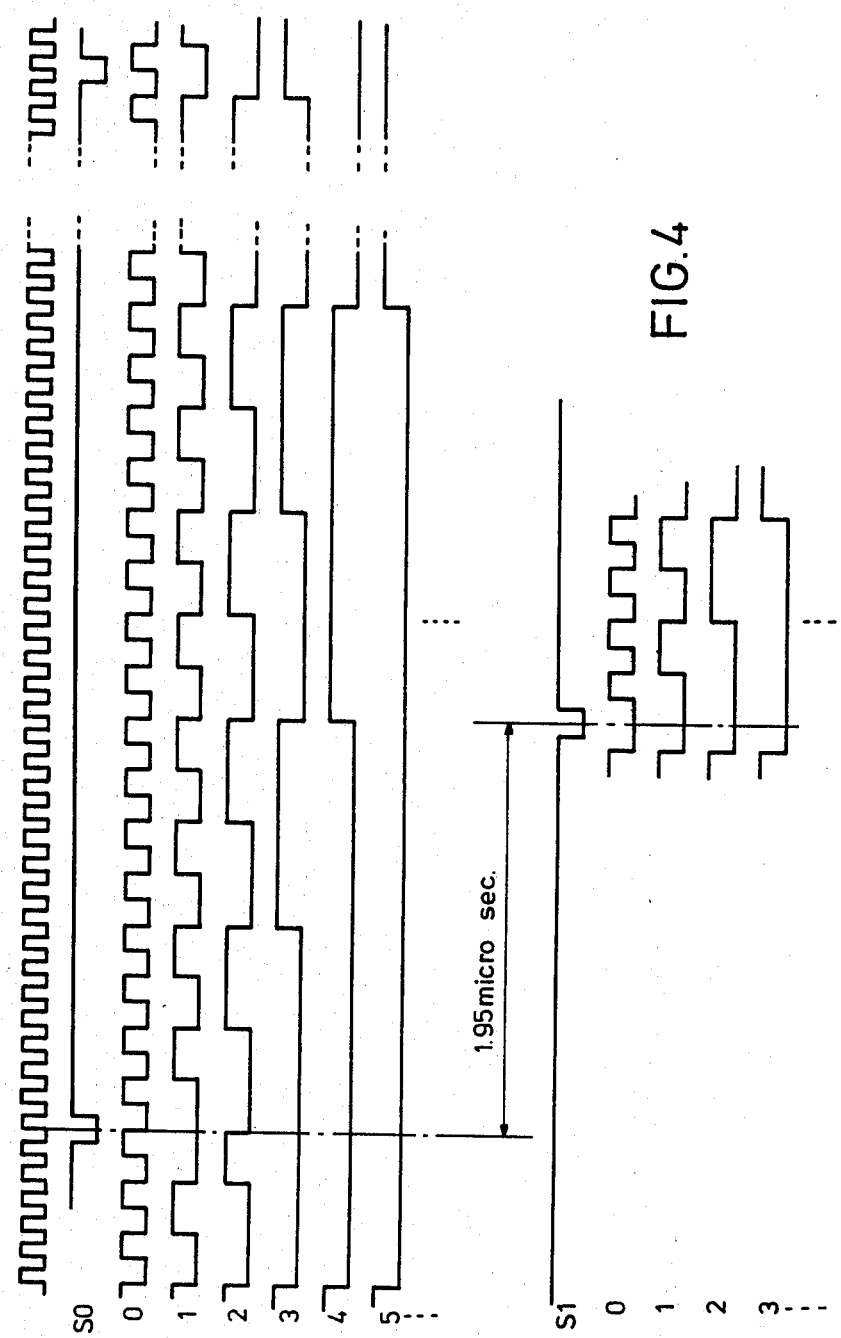
FIG. 4 is a timing diagram showing pulses produced by a counter which forms part of the receiver of FIG. 3.

The counter CO is a synchronous presettable counter having 17 outputs T0 to T16, 16 data inputs L1 to L16, a load input LO used to parallelly load data fed to the data inputs into CO and a clock input CL to which the clock pulses CL are fed. The synchronizing pulses SO are fed to the load input LO and the data inputs L1 to L16 are earthed. The counter CO is for instance constituted by four 4-bit synchronous presettable counters of the type SN 74S163 and a D flip-flop connected in such a way as to form the synchronous counter CO. No details are given about the interconnections of the counters and the D flip-flop since this is of minor importance for the invention and is known to the person skilled in the art. The counter CO is fed with a clockpulse of 8.192 MHz (CL). The frequency (4.096 MHz) of the pulses appearing at the first output TO is half the clockpulse rate. This frequency is the fundamental rate at which the receiver works as will be shown later. FIG. 4 shows the output pulses 0, 1, 2, ... in function of time appearing at the outputs T0 to T16 respectively before and after the advent of a synchronizing pulse. When this pulse occurs all the outputs T0 to T16 are reset during a leading edge of the clockpulse CL. As mentioned earlier the synchronizing pulses (e.g. S0) are occurring at a time interval of 8 milliseconds. On this FIG. 4 are also shown a synchronizing pulse S1 synchronizing counter C1 of receiver RC1 and pulses 0, 1, 2, 3 ... appearing at the outputs T0, T1, T2, ... (not shown) of counter C1. Synchronizing pulses S0 and S1 are 1.953 microseconds apart (1.953=7.8/4, 4 receivers of 16 channels each).

The filter part F (FIG. 3) mainly includes an input register RO wherein the input samples coded according to the A-law signal compressing characteristic are stored, a memory ME1 to translate the binary value of each input sample into a logarithmic binary value in base system 256, a coefficient bank CB storing the binary coded logarithmic values of filter coefficients, a translator circuit TR to translate the addresses appearing at the counter outputs T1 to T11 in order to address the coefficient bank CB correctly as explained later, an adder AD1 to add the logarithmic values of the input samples and the corresponding filter coefficients read out from CB, a memory ME2 wherein are stored the binary coded linear values of the corresponding added logarithmic values and the two's complement thereof, an exclusive OR gate EO providing an output when both sign bits of the filter coefficients and the samples are different, a pipe line register RP to store the result read-out from memory ME2, an adder AD2 to add the value stored in AD2 and the filter results stored in accumulator AC as explained below, a transparent latch TL, a 2-1 selector S2-1, delay circuits DE1 and DE2 and demultiplexer DM.

Before describing the operation of the digital filter part F it will be helpful to recall some principles used hereinafter concerning finite duration impulse response (FIR) digital filters. Fore more details concerning these principles reference is made to the books "Introduction to Digital Filtering" by R. E. Bogner and A. B. Constantinides, pages 75 to 88, edited by John Wiley & Sons and "Theory and Applications of Digital Signal Processing" by L. R. Rabiner—B. Gold, pages 77 to 84 edited by Prentice-Hall Inc., Englewood Cliffs, New Jersey.

A linear digital filter receiving an input sample sequence $x[-(N-1)T], \ldots, \ldots, \ldots, x(-T), x(OT), X(T), x(RT), \ldots x[(N-1)T]$, T being the sampling time interval, can be defind via the principle of superposition as follows $$y(nT) = \sum_{k=0}^{k=N-1} C(kT)x[(n-k)T] \quad (1)$$

wherein $C(OT)$ to $C[(n-1)T]$ are the N weighting coefficients or filter coefficients defining the filter $$y_n = \sum_{k=0}^{k=N-1} C_k x_{n-k} \quad (2)$$

or $$\begin{aligned} y_0 &= C_0 x_0 + C_1 x_{-1} + \ldots + C_{N-1} x_{-(N-1)} \\ y_1 &= C_0 x_1 + C_1 x_0 + \ldots + C_{N-1} x_{-(N-2)} \\ y_n &= C_0 x_n + C_1 x_{n-1} + \ldots C_{N-1} x_{-(N-1)} \\ y_{N-1} &= C_0 x_{N-1} + C_1 x_{N-2} + \ldots C_{N-1} x_0 \end{aligned} \quad (3)$$

Thus, the output sequence $Y_n$ is the weighted sum over all previous values of the input sequence $x_n$ to $x_{n-(N-1)}$, $x(t)$ being the sampled function in the time domain. The filter can be considered as a shift register having N stages wherein the input sequence is shifted, each stage being connected to an output adder each via a weighting circuit. As long as all N samples $X_0$ to $x_{N-1}$ of a semi-infinite sequence $x_0, x_1 \ldots x_N, x_{N+1}$ are not shifted into the shift register $Y_n$ is a partial sum over the number of samples present in the filter, which attains its steady state condition only after the $N-1$ samples $x_0$ to $x_{N-1}$ have been fed therein. Normally a digital FIR filter is used on a "sample in, sample out" basis i.e. an output result $y_n$ is available everytime an input sample is fed into the filter. In the application of this invention however, an output is made available each time a number N of samples have been fed into the filter having N coefficients.

When the sequence 1, 0, 0, ... is fed into a FIR filter the output sequence $C_0, C_1, \ldots C_{N-1}$ is obtained. This sequence in the time domain is called the unit impulse response (UIR). The Z-transform of the filter is obtained from UIR as follows:

$$Z(z) = \sum_{K=0}^{k=N-1} C_k z^{-k} \quad (4)$$

wherein z is a complex variable.

The frequency response of the FIR filter is obtained by substituting z by $e^{jwT}$, $$j = \sqrt{-1} \, ,$$

w and T being the angular velocity and sampling period respectively. Thus, $$\begin{aligned} Z(e^{jwT}) &= \sum_{k=0}^{k=N-1} C_k e^{-jkwT} \\ &= |Z(e^{jwT})| \, e^{jp(w)} \end{aligned}$$

$|Z(e^{jwT})|$ and p being the modulus and phase of the complex quantity Z respectively.

Figure 11:
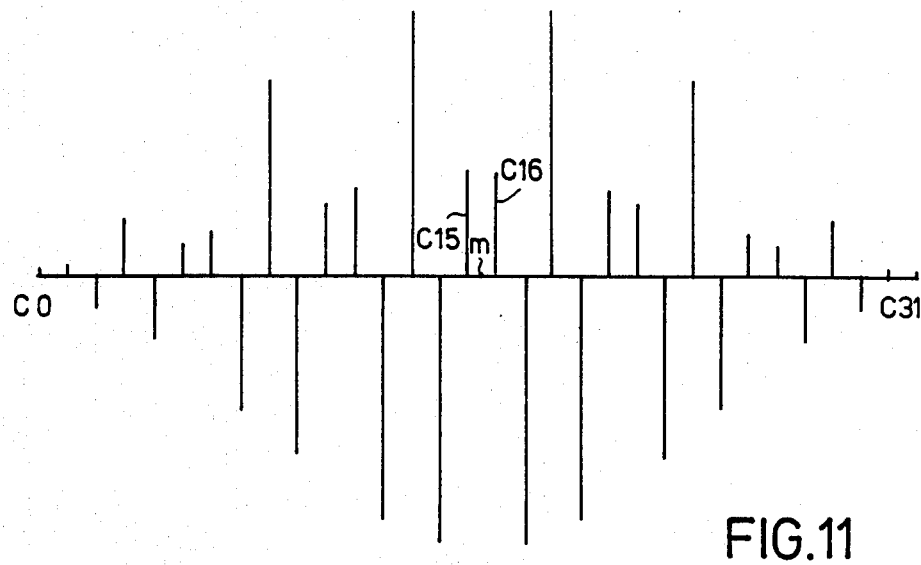
FIG. 11 shows part of a unit impulse response of a digital filter.
Figure 12:
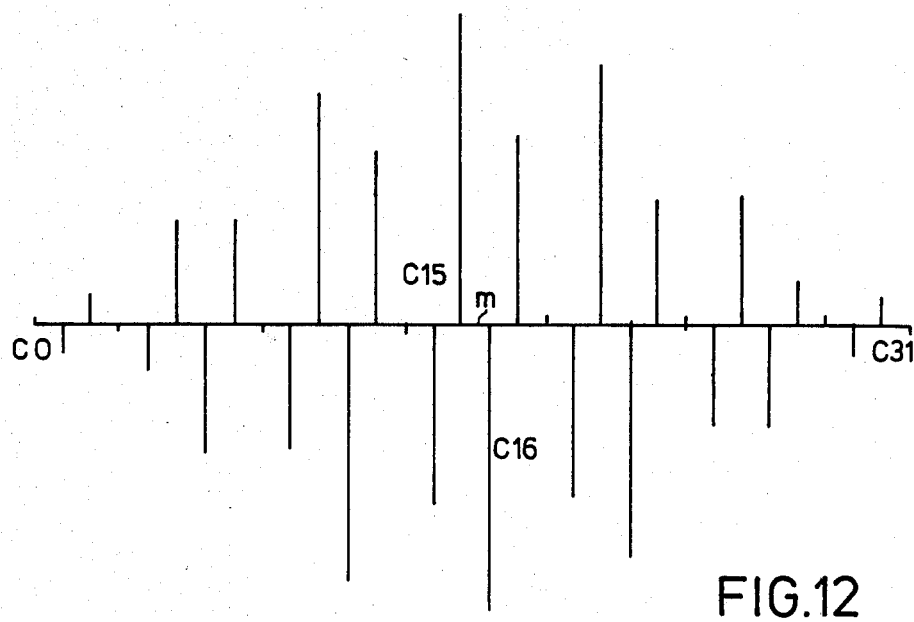
FIG. 12 shows part of a unit impulse response of the Hilbert transform of that of FIG. 11.

The FIR filters used in this invention are linear phase filters with constant group delay ($p = Aw + B$, A and B constants). In this case the UIR is symmetrical or anti-symmetrical. On FIG. 11 a symmetrical UIR is shown of a digital filter characterized by 32 coefficients $C_0$ to $C_{31}$. This response is symmetrical with respect to the midpoint m. Similarly, on FIG. 12 an anti-symmetrical UIR is shown having also 32 coefficients but with an anti-symmetrical response with respect to the midpoint m. In the first case, when the UIR is mirrored about the point of symmetry, the Z-transform is unchanged so that also the frequency response remains unchanged. In the second case however, when the UIR is mirrored about the point of anti-symmetry, the phase p of the frequency response is increased by an odd number of $\pi$ radians which means that the filter output signal is shifted by a multiple of 180° with respect to the output signal of the non-mirrored one. This is due to the fact that in this case the Z-transform of the mirrored UIR is opposite to that of the non-mirrored one, $(2q+1)\pi$ being equal to $-1$ (q is an integer).

When a Hilbert transformer is derived from a band-pass filter for instance having a symmetrical impulse response a filter can be obtained having substantially the same frequency response but the impulse response is anti-symmetrical. Also the output signal from a Hilbert transformer is phase shifted by $\pi/2$ radians with respect to the output signal of the band pass filter having substantially the same frequency response. More about Hilbert transformer can be found on pages 67 to 70 and 168 to 177 of the above mentioned book of L. R. Rabiner and B. Gold.

As mentioned earlier the operation of the receiver RC0 is similar to that of the three other receivers so that only the first one needs to be described. The operation of this receiver for the reception of MFC signals according to the signalling system R2 will be described in short hereinafter; reference being mainly made to FIG. 3. The detailed description follows later.

As mentioned earlier succeeding PCM encoded (compressed A law) samples (7 data bits +1 sign bit parallel) spaced by a 1.95 microseconds time interval sent from the multiregister MR to the receivers RC0 to RC3 are successively clocked into these receivers and each receiver receives in succession 16 first samples of 16 different channels each sample arriving every 7.8 ($1.95 \times 4$) microseconds. After 125 microseconds time interval the receiver receives 16 second samples etc. These samples are serially stored in the input register RO during a 7.8 microseconds time interval and are used as an address word to address the memory ME1 wherein at the corresponding address locations logarithmic binary value in base system 256 corresponding to these address words are stored. In the adder AD1 the logarithmic binary values read out from ME1 are added to the corresponding binary logarithmic values of filter coefficients read out from the coefficient bank CB. The way of carrying out these additions and the reading out of the coefficient bank is explained more explicitely in the detailed description. The partial filter output results of the adder AD1 are used as address words to address memory ME2 wherein at the corresponding locations linear binary values corresponding to these address words are stored. The values read out from ME2 are temporarily stored in register RP. The partial filter results are then added in adder AD2 and are stored in the accumulator AC to form complete filter results as explained later. The complete filter results are transferred to and stored in the input register (not shown) of the microprocessor PR and are further processed therein.

In fact, the digital filter part F is constituted by 16 individual multiplexed digital filters since the samples belonging to 16 different channels are treated by the 16 filters i.e. 6 band pass filters each one of which is centered around a different frequency of the 6 frequencies out of which two frequencies are chosento form a signalling code, 6 associated Hilbert transformers, two multiband guard filters and the two associated Hilbert transformers. The aim is to derive a phase independent signal from the outputs of these filters and the associated Hilbert transformers. This is possible since as mentioned earlier the output values filtered from these associated filters from a same sine shaped input signal are phase shifted by an angle of 90°. A phase independent signal is obtained by adding the squared output values. Each filter has 128 filter coefficients so that at least 128 samples per channel have to be fed before the filter is able to supply a complete filter output. Since each sample is separated by a 125 microseconds time interval a complete filter output is obtained every 16 milliseconds per channel, the filter output results of a channel being delayed with respect to the preceding one by 4 frames as will be shown later. This delay is necessary to allow the processor to process the filter results of a particular channel during that time interval. In fact the filter part F is able to supply a complete filter output per channel every 8 milliseconds due to the fact that the filter part calculates 2 output results for a same channel, the calculated values for these two outputs being shifted by 64 frames with respect to each other as explained later. It is evident that after the processor has processed the 16 channels a time interval of 125 microseconds$\times 16 \times 4 = 8$ milliseconds has elapsed so that after the results of the 16th channel have been processed, the first channel is again treated.

It should be noted that a complete filter output per channel consists of 16 complete results, i.e. 12 results for the 6 band pass filters for the 6 frequencies and their associated Hilbert transforms, 4 results for the 2 guard filters and their Hilbert transforms. When 16 complete results for a predetermined channel are available also 16 incomplete output results shifted by 64 frames have been stored but these results will not be transmitted to the microprocessor. Each time when a complete result is available, and this happens every 244 ($=/125/(16\times 32)$) nanoseconds, it is transmitted to the microprocessor's buffer. For the 16 complete results this occupies a time interval of only 244 nanoseconds$\times 16 = 3.9$ microseconds. During the remainder 3.9 microseconds of the 7.8 microseconds time interval the above mentioned 16 incomplete filter results are stored in the accumulator AC. The transmission of the complete filter results occurs during the first frame of the mentioned 4 frames. During the remaining time of the first frame time interval no information is sent to the microprocessor since a new complete result (of the next channel) is only available 3 frame time intervals after the first one. During these 3 frame time intervals the microprocessor processes the results stored. New complete results of the next following channel are available at the beginning of the fifth frame. These results are then stored in the microprocessor's buffer during the fifth frame and then processed during the three following frames etc.

For each channel during the above three frame time intervals the processor carries out the following jobs according to the program of instructions stored in memory M.

A. During the recognition phase

1. It calculates the 8 phase independent moduli from the 8 pairs of complete filter results obtained, each pair being a complete result from a given filter and its Hilbert transformer. Each modulus is calculated from the following approximate formula $$\sqrt{a^2 = b^2} \simeq a + \tfrac{1}{2} b \qquad a > b$$

wherein a and b are a pair of filter results. More information concerning the above approximate formula can be found on pages 921 and 923 of a paper by Morio Onoe published in the Proceedings of the IEEE, July 1972.

2. It determines the largest value among the 8 moduli and derives two threshold values D1 and D2 therefrom. These threshold values D1 and D2 are situated at 12 dB and 24 dB below the largest value respectively.

3. It compares the filter results from the two guard filters with the threshold value D1 and accepts the results when they are smaller than D1. When one of the filter results is larger than D1 the receiver is blocked.

4. It further compares the filter results of each of the remaining 6 filters with threshold values D1 and D2. When a result is larger than D1 or smaller than D2 it is accepted and registered. When a result is comprised between D1 and D2 the receiver is blocked.

5. It performs a two-out-of-six test one the registered values, i.e. the receiver recognizes the received signal when two filter results and the remaining four ones of the mentioned six filter results are larger than D1 and smaller than D2 respectively.

6. It accepts the recognized signal only when a persistence test has been carried out successfully i.e. the signal must be recognized during two successive two-out-of-six tests separated by a eight milliseconds time interval. The receiver is blocked whenever a filter gives out a result having a value comprised between the two threshold values D1 and D2. This is the case when noise signals are received which generally have a large frequency spectrum and thus make at least one and generally more than two of the filters react.

B. During the locking phase.

When a signal has been accepted the processor now carries out a second or locking phase program.

1. During this locking phase it compares the 6 filter results with a fixed threshold value D3 (= −38 dBm, 0 dBm corresponds with a level of 774.6 millivolt). At least two successive results separated by a 8 milliseconds time interval must be larger than D3. When one or more filters supply an output larger than D3 due to noise signals having been received, the receiver will remain locked so that the reception of noise signals during the locking phase does not influence the receiver which is thus rendered immune to every incoming signal providing a filter result value larger than the −38 dBm threshold value. Backward signals are now sent to the emitter which upon reception thereof stops the emission of forward signals. If the receiver were not rendered immune in the way explained hereabove and if the receiver were for instance released immediately after having recognized a digit it could recognize a same digit twice in succession when simultaneously a given forward signal and noise signals are present and when these noise signals cease before the end of emission of the forward signal.

When after the two successive checks separated by 8 milliseconds the filter results are smaller than D3, the receiver is released.

2. When a signal has been accepted and thus a digit has been recognized, the binary value of this digit is registered in the output buffer MO.

Figure 13:
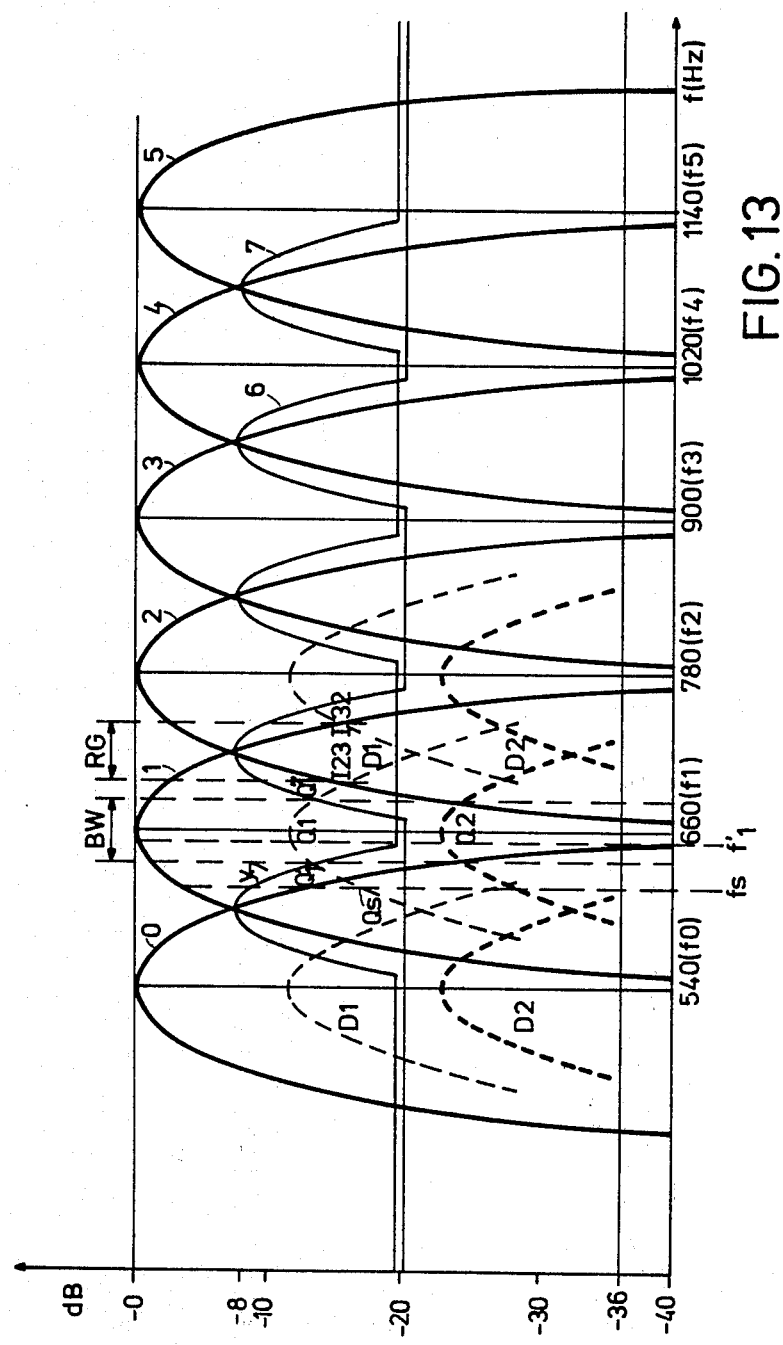
FIG. 13 shows a set of frequency response curves of filters relative to the receiver of FIG. 3.

The frequency responses or filter curves of the filter part F described above will now be commented. These filter curves which are shown in FIG. 13 consist of six individual filter curves 0 to 5 each of which are centered around a different one of the six signalling frequencies f0 to f5 used in the MFC system mentioned earlier, and two guard filter curves 6 and 7. The signalling frequencies are 120 Hz apart from each other. Each individual filter curve 0 to 5 relative to the 6 pairs of bandpass filters denoted by C0 to C5 and their corresponding Hilbert transformers H0 to H5 respectively have following characteristics 1. Bandwidth 120 Hz (±60 Hz around the centre frequency) at −10 dB attenuation
2. Side lobes (not shown) below −36 dB
3. Bandwidth 220 Hz at −36 dB attenuation. It is recalled that the filters of each pair Ci, Hi (i=0 to 7) have substantially the same frequency response that the phases of the output signals of these filter pairs differ by an odd number of $\pi/2$ radians and that the outputs of each pair are used to compute therefrom the amplitude of the signal received in order to obtain a phase independent value. The corresponding symmetrical and anti-symmetrical unit impulse responses of each of the individual filters and the corresponding Hilbert transformers have all 128 coefficients respectively.

The only threshold values D1 and D2 shown are derived from curves 1 and 2 on FIG. 13 and are located at −12 dB and −24 dB below the tops of curves 1 to 6 respectively. These tops have a 0 dB reference value.

The guard filter system consists of two multiband filters C6 and C7 and the corresponding Hilbert transformers H6 and H7 having interleaved pass bands 6 and 7. Filters C7, H7 have three pass bands while the filters C6, H6 have only two. Each of the pass bands of these filters is centered around a different one of the frequencies 600 Hz, 720 Hz, 840 Hz, 960 Hz and 1080 Hz, which are the arithmetic means values of two succeeding signalling frequencies. The guard filters have following characteristics:

1. Maximum gain at about −8 dB
2. Side lobes (not shown) below −21 dB.

It should be noted that these FIR filters have been computer designed using the REMEZ exchange algorithm (J. McClellan) as described in the earlier mentioned book "Theory and Applications of Digital Signal Processing" by L. R. Rabiner and B. Gold, pages 194 to 204.

It should further be remarked that each of the filter pairs C0, H0 to C5, H5 (filter curves 0 to 5) have a bandwidth BW of substantially 46.5 Hz (only shown for curve 1) delimited by the intersections of filter curves 0 to 5 and thresholds D2. The bandwidth BW of curve 1 for instance is delimited by the intersection of its threshold D2 and the neighboring filter curves 0 and 2. The bandwidth is further delimited by the intersection of threshold D1 and filter curves 6 and 7. In this example the intersection Q'1 and Q'1 of D1 of curve 1 and filter curves 6 and 7 are substantially on the vertical lines passing through the intersections of D2 and curves 0 and 2. It is realized however that when curves 6 and 7 are raised for instance intersections Q'1 and Q"1 of D1 with 7 and 6 respectively will fall within the zone BW so that the position of the curves 6 and 7 may further decrease the bandwidth. Indeed, as mentioned earlier, when an output of filters 6 and 7 is larger than D1 the system is blocked. The reason why BW is limited by the intersection of D2 and the neighbouring filter curves will be explained later.

Different cases will now be considered.

1. Reception of a MFC signal including a double frequency component

It is supposed that the MFC signal includes components with frequencies f2 and f'1 the amplitude of the latter component being the largest and that furthermore the frequency f'1 is slightly different from f1 and is situated within the frequency band with bandwidth BW defined earlier. Threshold values Q1 on D1 and Q2 on D2 are derived from the largest response of filter pairs Ci, Hi (i=0 to 5) as explained earlier, this response being delivered by filter pair Cl, Hl. The filter output values from the guard filter pairs C6, H6; C7, H7 are now compared with the threshold value Q1 and since these output values are smaller than Q1, the result is accepted for further examination. Output values from filter pairs Ci, Hi (i=0 to 5) are now compared in succession to threshold values, Q1 and Q2 and the comparison yields as follows:

| pairs | output value |
|-------|--------------|
| C0, H0 | smaller than Q2 |
| C1, H1 | larger than Q1 |
| C2, H2 | larger than Q1 |
| C3, H3 | smaller than Q2 |
| C4, H4 | smaller than Q2 |
| C5, H5 | smaller than Q2 |

In this case two filter output values are larger than Q1 whilst the remaining four output values are smaller than Q2 so that this result will be accepted by the 2 out-of-6 test carried out by the processor PR. It is evident that when an input signal has a frequency outside the band BW either a neighbouring filter will yield an output value situated between Q1 and Q2 so that in this case the receiver is blocked or will yield an output value larger than Q1 but in this case the test 2 out-of-6 will fail since two neighbouring filters yield output results larger than Q1 for a same frequency signal. As mentioned before the band width is normally limited by the intersection of D2 and two neighbouring filter curves. A further limitation of the bandwidth is realized by means of the guard filters.

As far as the reaction to noise is concerned either the test 2-out-of-6 will fail or filter output values comprised between Q1 and Q2 will be obtained since a noise signal generally has a large spectrum. It should be noted that an analog receiver using the same principle of two thresholds is described in the U.S. Pat. No. 3,961,143 so that this question will not further be developed here.

2. Reception of a single frequency signal

In this case when no guard filters were present imitations (wrong recognition of a digit) may occur due to the fact that the receiver reacts favourably to the reception of a single frequency signal. Indeed, if a signal with only frequency fs is received both filter pairs C0, H0; C1, H1 will react favourably since the filter output values are both larger than the threshold value Qs. If no other frequency signals are present the test 2-out-of-6 will be positive. However, guard filter pair C7, H7 will react negatively since its output value y7 is larger than Qs on D1. From FIG. 13 it is derived that the frequency regions such as RG delimited by the intersections such as I23 and I32 of threshold curves D1 with neighbouring filter curves (2 and 3 in this case) have to be protected to eliminate imitations caused by single frequency signals and this is realized by introducing the guard filters as shown.

Figure 14:
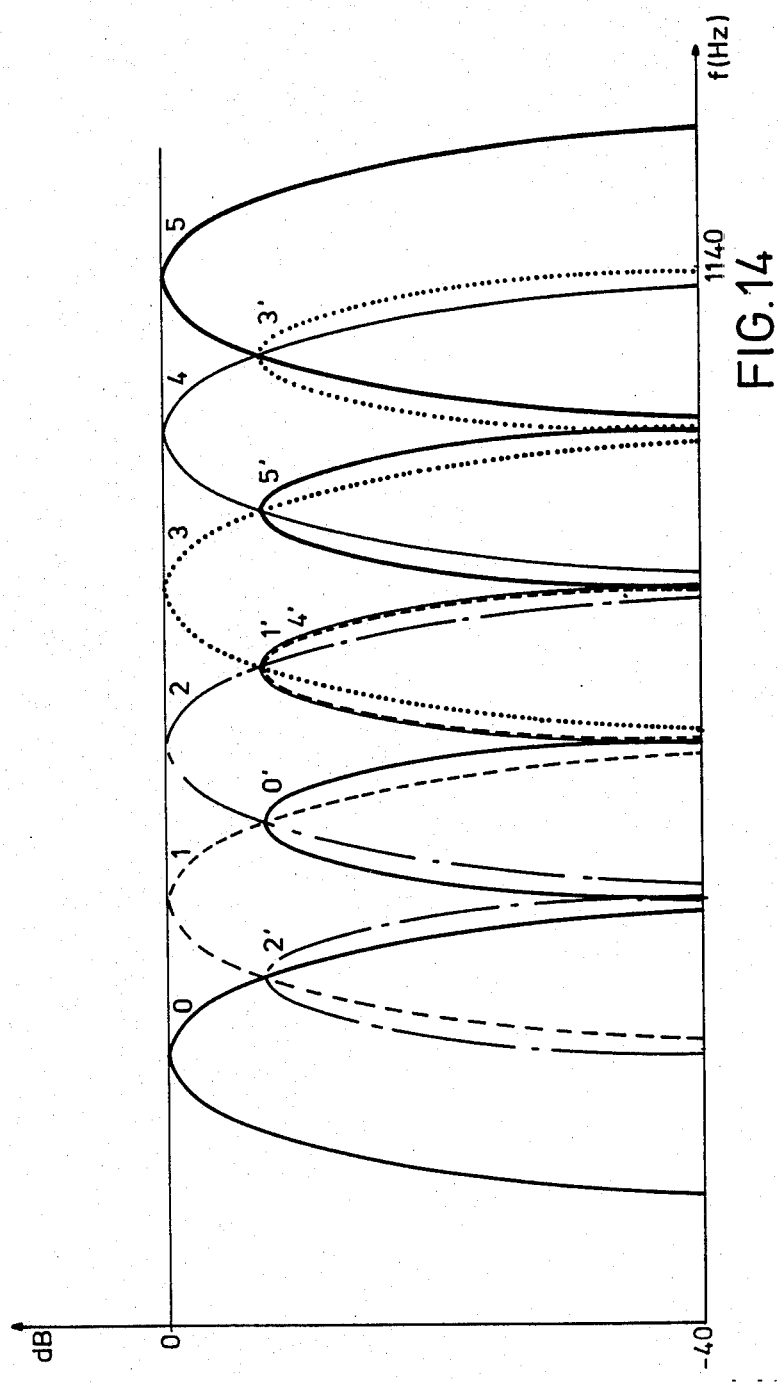
FIG. 14 shows another set of frequency response curves of filters relative to the same receiver.
Figure 15:
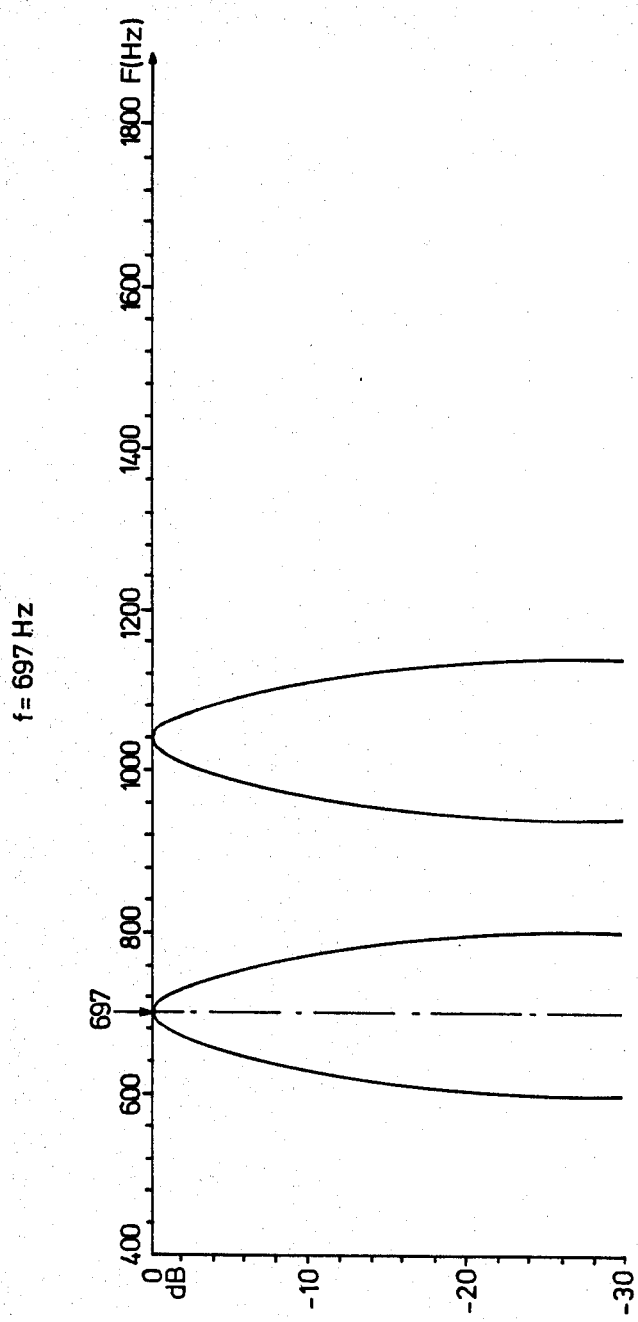
FIG. 15 to 23 show further sets of frequency response curves of filters forming part of a multi-frequency receiver.
Figure 16:
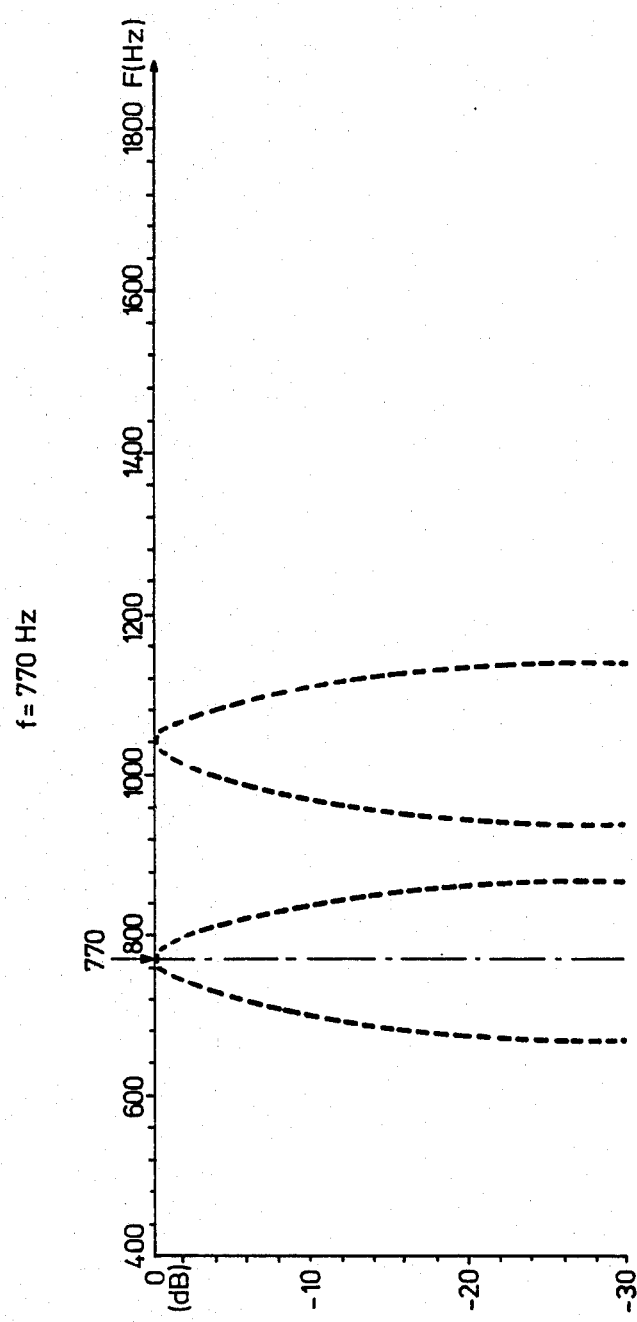
Figure 17:
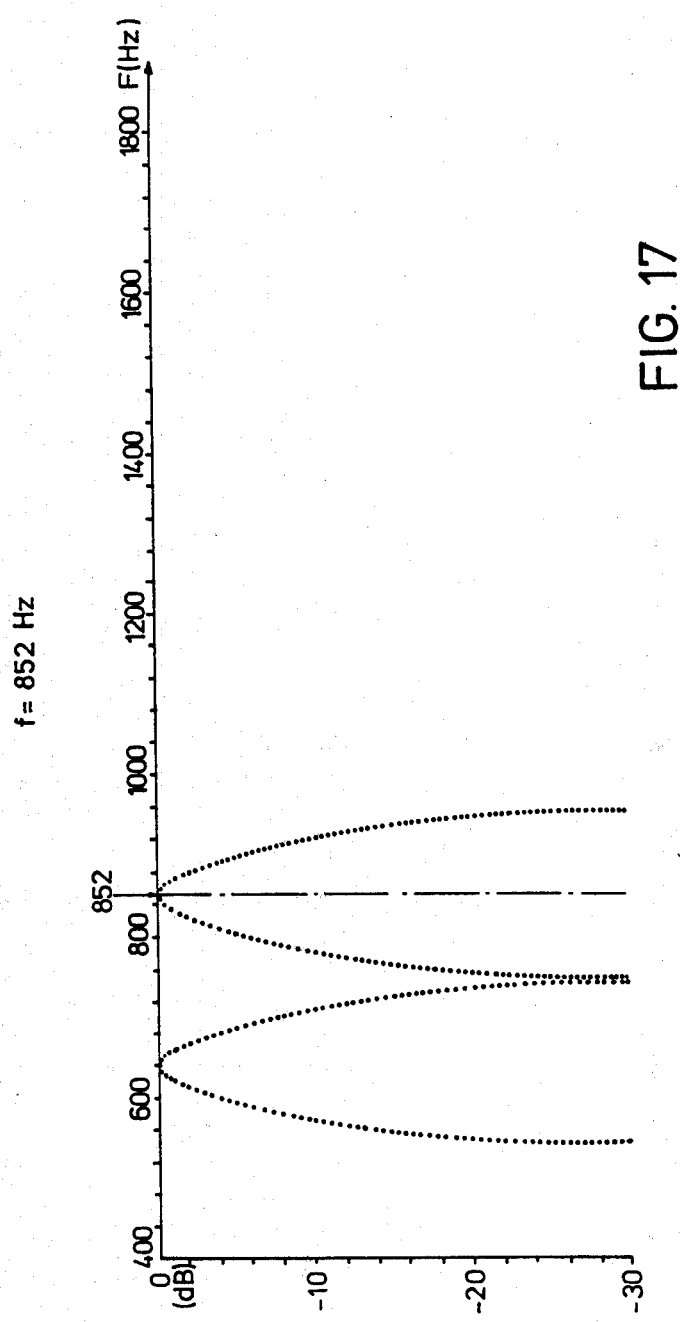
Figure 18:
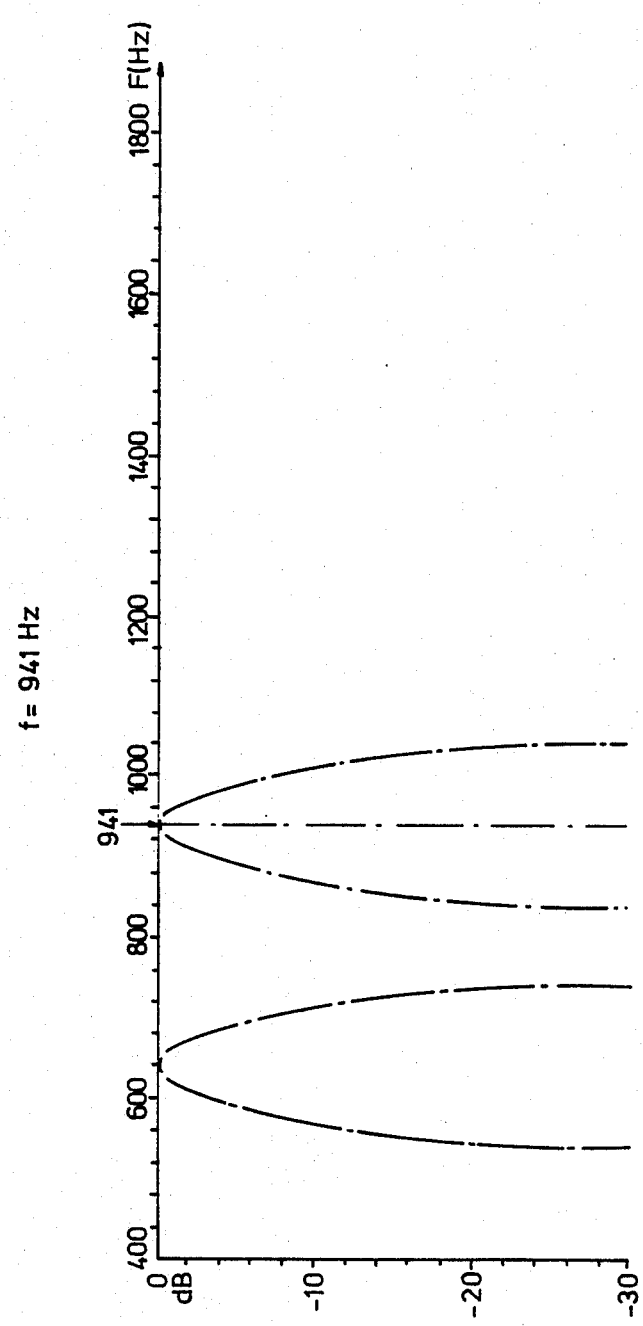
Figure 19:
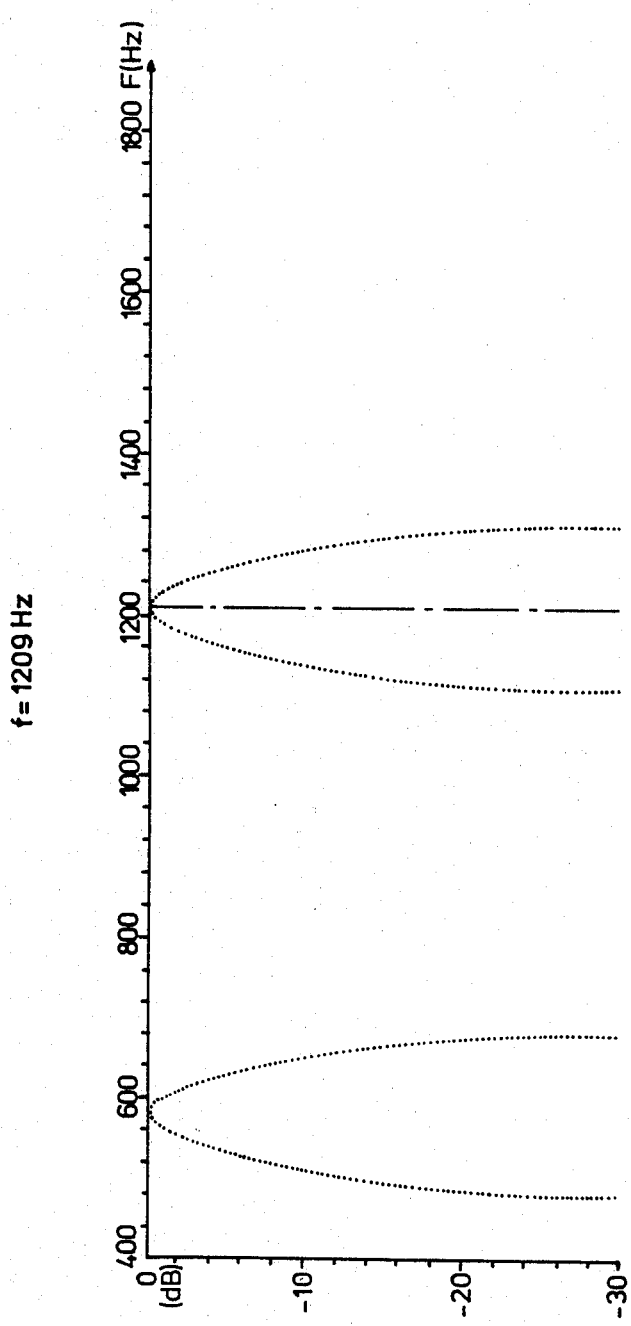
Figure 20:
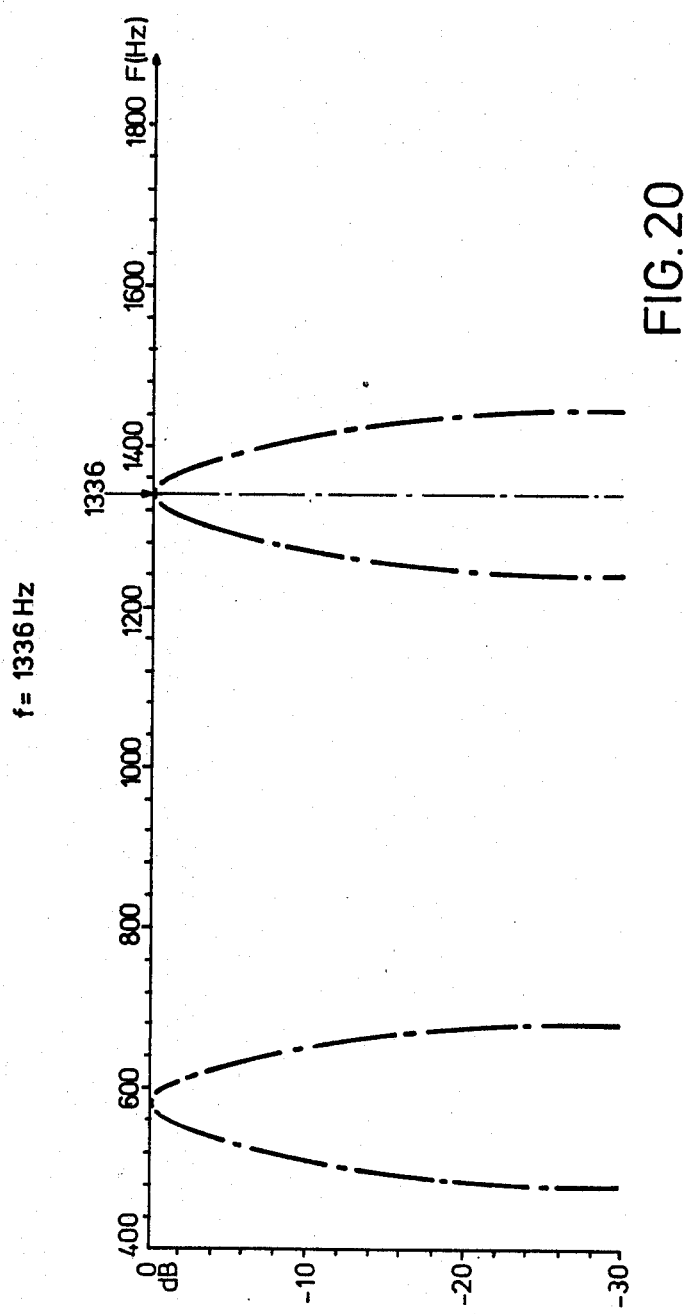
Figure 21:
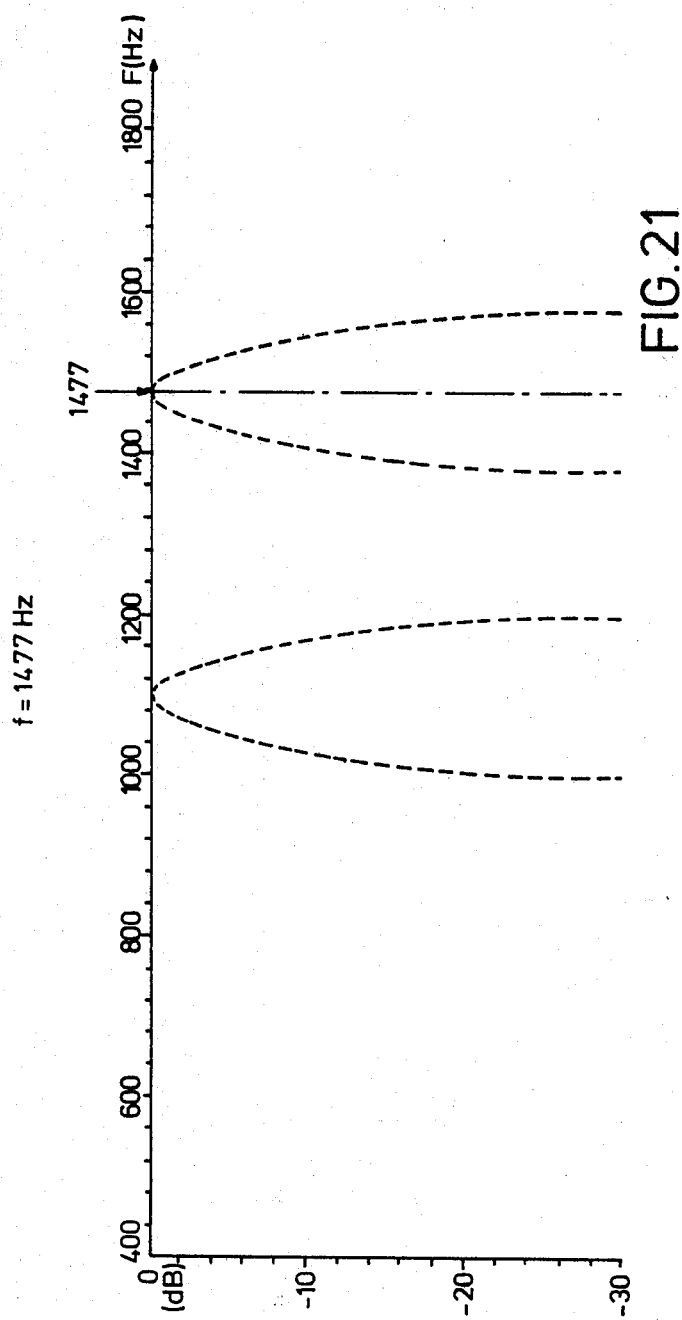
Figure 22:
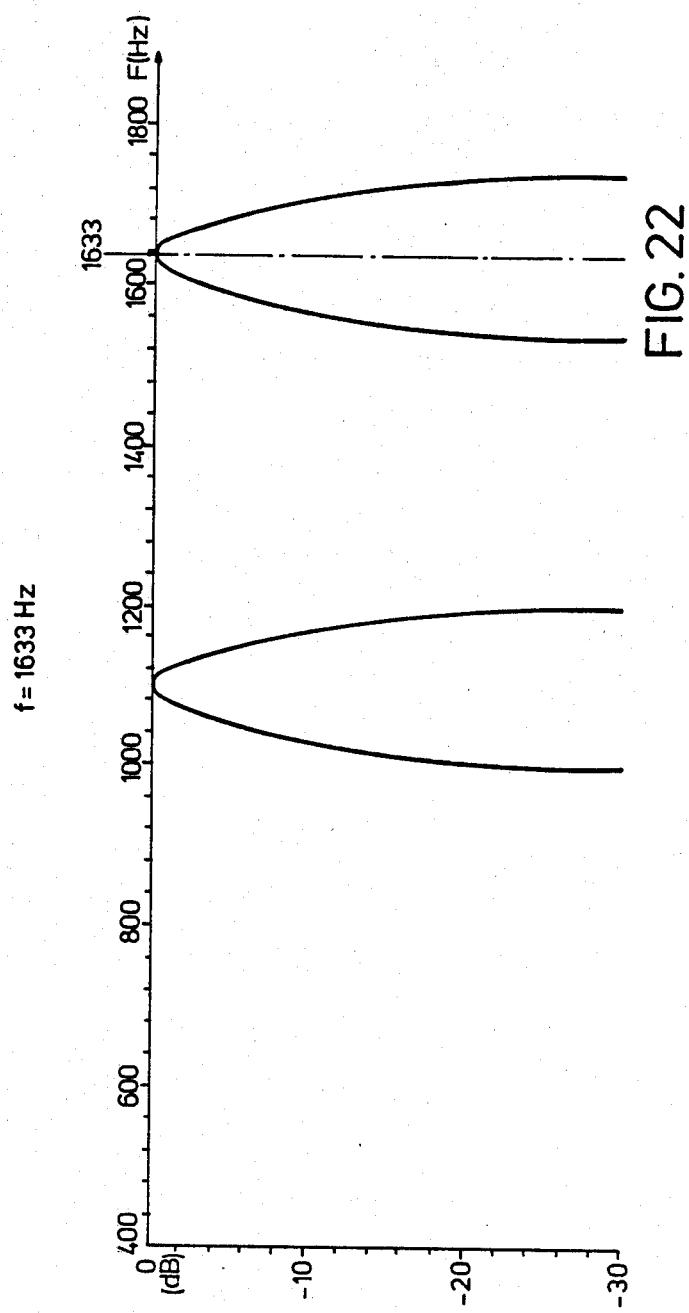

It should be noted that it is not necessary to have separated guard filters as shown. Another possibility is that the lobes of the guard filters form part of the individual filters. An example is shown in FIG. 14 wherein lobes 0', 1', 2', 3', 4' and 5' form part of the filter curves 0, 1, 2, 3, 4 and 5 respectively.

Figure 5:
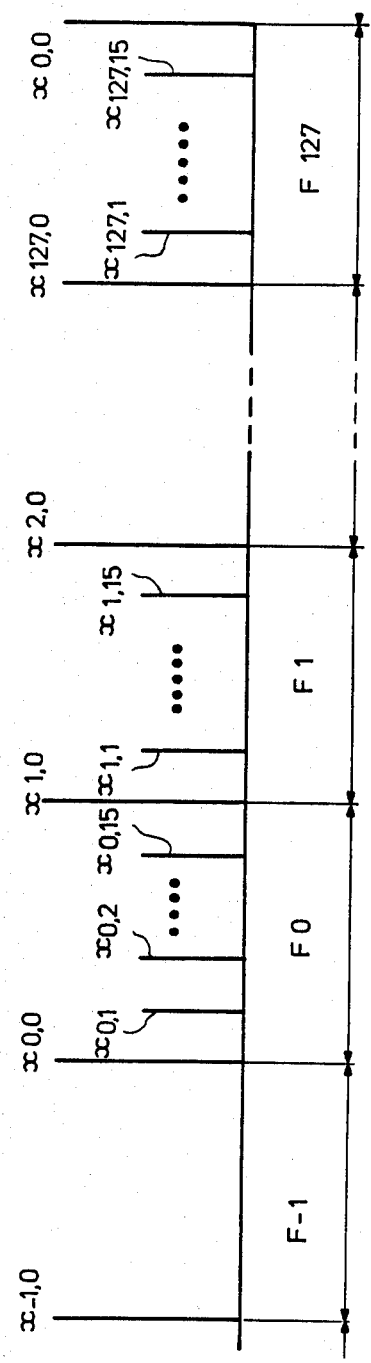
FIG. 5 shows sample sequences of sampled input signals of 16 channels fed to the receiver of FIG. 3.

Before describing the operation of the digital filter part F in detail it will be helpful to consider FIG. 3 in addition to FIGS. 5, 6 and 7. FIG. 5 shows sample sequences $x_{k,0}$ to $x_{k,15}$ wherein k is a subscript corresponding to the frame $F_k$ the second subscript indicating the corresponding channel. The sample belonging to the 128th frame and the 16th channel is $x_{127,15}$. It should be noted that 128 samples per channel are used by the filter part during a complete cycle to obtain a complete filter result and that with respect to this cycle the samples $x_{0,j}$ and $x_{128,j}$; $x_{-1,j}$ and $x_{127,j}$ j=0 to 15 are equivalent, i.e. they are multiplied by the same filter coefficients, although the same values of $x_0$ and $x_{128}$; $x_{-1}$ and $x_{127}$ may be different. This is indicated in a general way by the following expression:

$$(x)_{k,j} \equiv (x)_{k \pm 128, j}$$

the brackets indicating that the sample values may be different.

It should also be remarked that since a frame time interval is 125 microseconds the time interval between two succeeding samples of the same channel is 7.8 microseconds (125/16).

FIG. 6 shows in an abbreviated way how the input sample sequence is convoluted with the unit impulse responses of the 6 individual filters and the 2 guard filters. These impulse responses are the sequences $$C_k^i \; (i=0 \text{ to } 7, k=0 \text{ to } 127);$$

$$H_k^i \; \text{(for the Hilbert transformers)}$$

For example $C_k^0$ is the sequence:
$C_0^0, C_1^0, C_2^0, \ldots C_{127}^0$ which is the unit impulse response of the individual filter $C_0$. The box $0_{64}$ at the intersection of the first row $x_{k,o}$ and first column F=k=o indicates that the filter coefficients $$C_0^0, H_0^0, C_0^1, H_0^1, C_0^2, H_0^2, \ldots, C_0^7, H_0^7$$

$$C_{64}^0, H_{64}^0, C_{64}^1, H_{64}^1, \ldots, C_{64}^7, H_{64}^7$$

are successively multiplied by the input sample value $x_{0,0}$.

In fact, since the logarithmic values of these coefficients and samples are used additions instead of multiplications are carried out as will be explained later. Similarly the box $68_4$ (16th row, first column) stand for the successive logarithmic additions of $$C_{68}^0, H_{68}^0, C_{68}^1, H_{68}^1, \ldots C_{68}^7, H_{68}^7$$

$$C_4^0, H_4^0, C_4^1, H_4^1, \ldots C_4^7, H_4^7$$

and the input sample value, $x_{k,15}$ (k=0).

It should be remarked that after the four frames F0 to F3 have been handled completely all the 128 coefficients of all the 16 filters (8 filters + 8 Hilbert transformers) have been used once and that for the four following frames F4, F5, F6 and F7, row 0 (FIG. 6) the same logarithmic additions have to be carried out as for those of frame F0, F1, F2, F3, row 15 respectively but in reverse order, i.e. the logarithmic value of the input sample $x_{k,0}$ is added successively to the logarithmic values of

| | | | |
|---|---|---|---|
| $C_4^i$ | and | $C_{68}^i$ | k = 4 |
| $C_5^i$ | and | $C_{69}^i$ | k = 5 |
| $C_6^i$ | and | $C_{70}^i$ | k = 6 |
| $C_7^i$ | and | $C_{71}^i$ | k = 7 |

For the following rows (1 to 15) no reversal takes place but the values of a particular row can be found in a preceding row of the four preceding frames. Further properties of the convolution table of FIG. 6 will not be considered now but will be explained in detail later.

FIG. 7 shows the way of storing the filter coefficients relative to the box $0_{64}$ in 32 successive lines of the read-only memory CB having $32 \times 16 \times 4 = 2048$ locations of at least 10 bits each, 8 bits to store the coded logarithmic value, one sign bit and one control bit for each filter coefficient. The memory parts Sn and Ct of CB store these sign bit and control bit for each coded logarithmic value respectively. The read outputs of these memory parts Sn and Ct are connected to one of the inputs of the exclusive OR-gate EO and to stage SR of RP respectively. The control bit is set to 1 in each coded filter coefficient value except in that of the first coefficients CO, HO for reasons which will become clear later. The read-only memory CB is for instance constituted by six $1K \times 8$ bit memories of the type Intel 3628, 3 memories being programmed with filter coefficients relative to the filters for the forward frequencies, the 3 remaining being reserved for the backward frequencies. To read out this memory 11 bit address words are needed. These addresses are supplied by the address counter at outputs T1 to T11 (FIG. 3). A translator circuit TR, to be described later, has to be used to take into account the charge after every four frames as mentioned above. Since the logarithmic value of every incoming sample has to be added to the logarithmic value of 32 filter coefficients each adding operation may last not more than 244 nano seconds (7.8/32 microsec.). The read rate of the memory CB is thus 4.096 MHz which is the fundamental rate at which the filter part F works.

As mentioned above in the read-only memories CB and ME1 the binary coded logarithmic values of the filter coefficients and input samples are stored respectively. These input samples are coded according to the known A-law (compression characteristic) which will be described in some detail below. In a location of read-only memory ME1 is stored that binary coded logarithmic value which corresponds to the coded value of the input sample equal to the location address. The law according to which the conversion of an input sample value coded according to the above compressed code into a binary coded logarithmic value is carried out is explained herebelow, reference being first made to FIG. 10. In this FIG. is shown in full lines the above mentioned signal compression characteristic according to the known A-law which respresents the coded signal values in function of the normalized linear analog voltage values v. The maximum voltage values corresponding with the normalized value 1 is that corresponding with a signal of 3.14 dBm or 1.57 Volt. There are 8 linear segments OA to GH and each segment is divided into 16 equal parts. The voltage sample values comprised within an interval delimited by an above mentioned equal part of each linear segment has the same code. The values comprised within the interval (v', v") for instance have the same binary code (one sign bit, 3 segment bits and 4 quantum bits). It should be noted that the segment OA passes through the origin O and not through the point with absciss value 1/256 on the v-axis so that the segments OA and OB have the same slope. In dashed lines is shown a logarithmic curve passing through points H, G, F, E, ... A and v = 1/256. It can easily be shown that this curve is represented by the equation $$y = 128 \log_{256} 256 \, v \qquad (1)$$

256 being the base of the logarithm.

| | |
|---|---|
| for $v = \dfrac{1}{256}$ | y = 0 |
| $v < \dfrac{1}{256}$ | y is negative |
| $v > \dfrac{1}{256}$ | y is positive |
| v = 1 | y = 128 |

To obtain the logarithmic values corresponding with a sample value coded according to the compressed A-law the following intermediate operations are carried out:
1. The analog value of v corresponding to the coded sample value is determined. Since the v values comprised within an interval delimited by the above mentioned equal parts have the same code the arithmetic mean value of the limiting v values is taken as is usual in the digital to analog conversion. For coded sample 11101011 for instance the corresponding v value is $v' + v''2$.

This mean value is fed into the equation $$y = 128 \log_{256} 256v + 128 \qquad (2)$$
$$= 128 (\log_{256} 256v + 1) = 128 \log_{256} 256^2 v$$

Figure 10:
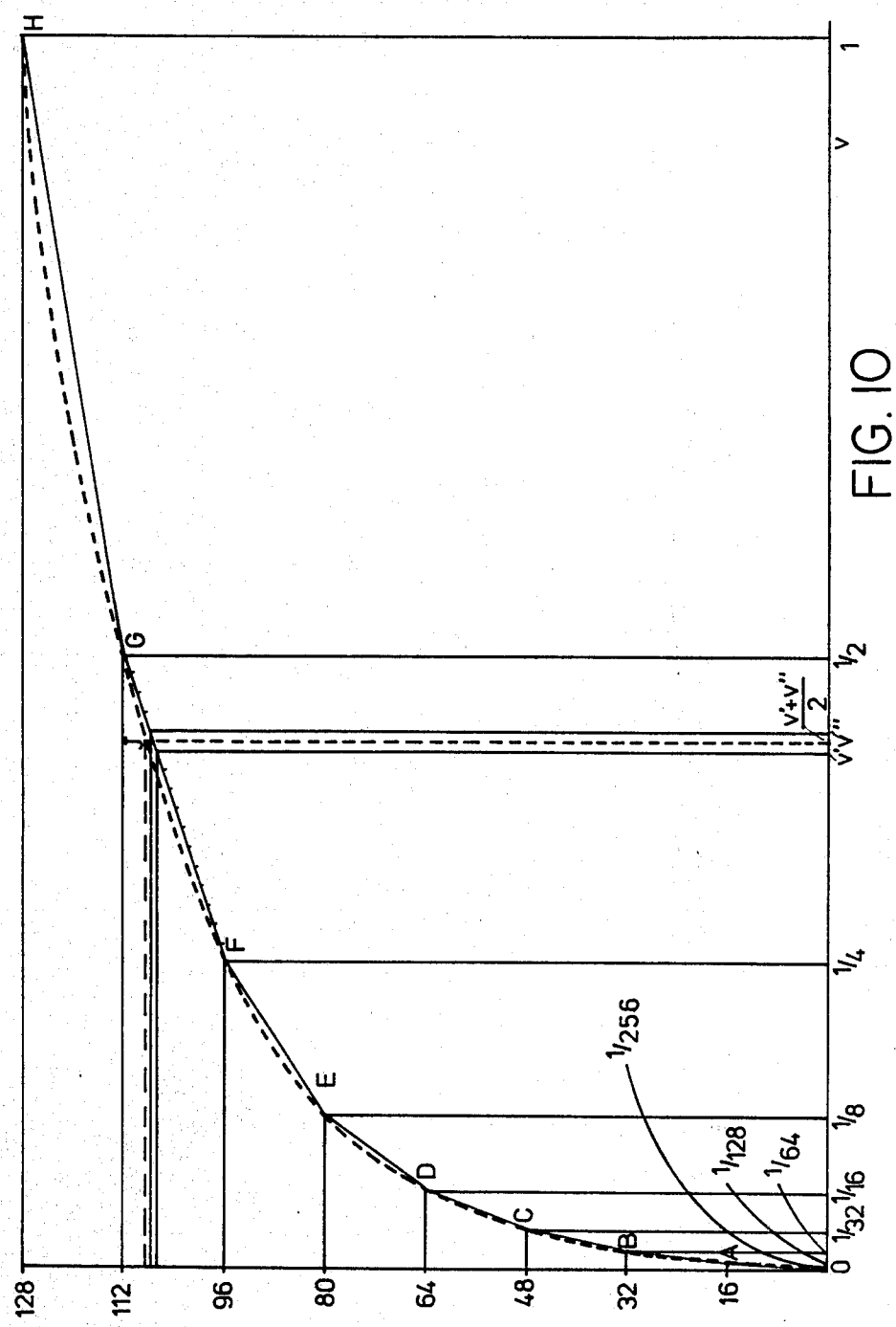
FIG. 10 is a logarithmic curve showing the input sample or filter coefficient values in function of their logarithmic value.

The curve representing this equation is that of FIG. 10 (in dashed lines) but shifted over an amount of 128 upwards. The value of y thus obtained is rounded off and is coded. This coded value is stored in the memory ME1 as explained earlier. From equation (2) it is derived that only a sample having a normalized value as small as $$(1/256^2) = (1/65536) = 1.5 \times 10^{-5}$$

has a zero logarithm ($\log_{256} 256 = 1$) and normalized sample values larger than $1.5 \times 10^{-5}$ have a positive logarithmic value. By proceeding in this way there is no need to use negative logarithmic values since sample values having v values smaller than $1.5 \times 10^{-5}$ may be neglected.

It is evident that the quantising errors due to the coding of the samples remain but the use of logarithmic values instead of the compressed ones is a better approach.

Similarly, a shifted logarithmic curve similar to that used for the input samples is used to code the filter coefficients to be stored in the coefficient bank CB. The coefficient values obtained from a unity gain filter are the abscis values and also in this case no negative logarithmic values are considered. The sign bit of the filter coefficient and of the input sample are exclusive OR gated in EO and the output of this gate decides on whether a value or its two's complement is read out of the memory ME2 which translates the logarithmic input values, used as address input words, to the corresponding linear values. This memory ME2 therefore has two sections. One section which contains the normal linear values is enabled when the signs of the input sample and the corresponding filter coefficient are the same and another section which contains the two's complements of the linear values and which is enabled when the above signs are different.

When a sample, say $x_{0,0}$, arrives at the input of the receiver, it is clocked into the input register RO (e.g. combination of TI types SN 74S374) by means of the leading edge of a 7.8 microseconds period pulse fed to the enabling input of RO from the T5 output of counter CO (FIG. 3) and the sample remains in the register during 7.8 microseconds. The memory ME1 is addressed and supplies the adder AD1 with the logarithmic sample value. During this 7.8 microseconds time interval the coefficient bank is addressed 32 times and supplies every 244 nanoseconds a logarithmic filter coefficient value which is fed to the adder AD1. The sign bit and control bit corresponding with each filter coefficient value read out is fed to one of the inputs of EO and to SR respectively. These logarithmic filter coefficient values are added to the logarithmic sample value and the adder output value is used as address word to address memory ME2 which supplies the corresponding linear value or its two's complement according to the output of the gate EO as explained above. Every 244 nanoseconds time interval a result appears at the output of ME2, the ME1, AD1 and ME2 causing an output delay of about 240 nanoseconds. The types used for the memories ME1, ME2 and adder AD1 are for instance the Intel types 3624, 3625 and the TI type SN7LS283 respectively.

Figure 8:
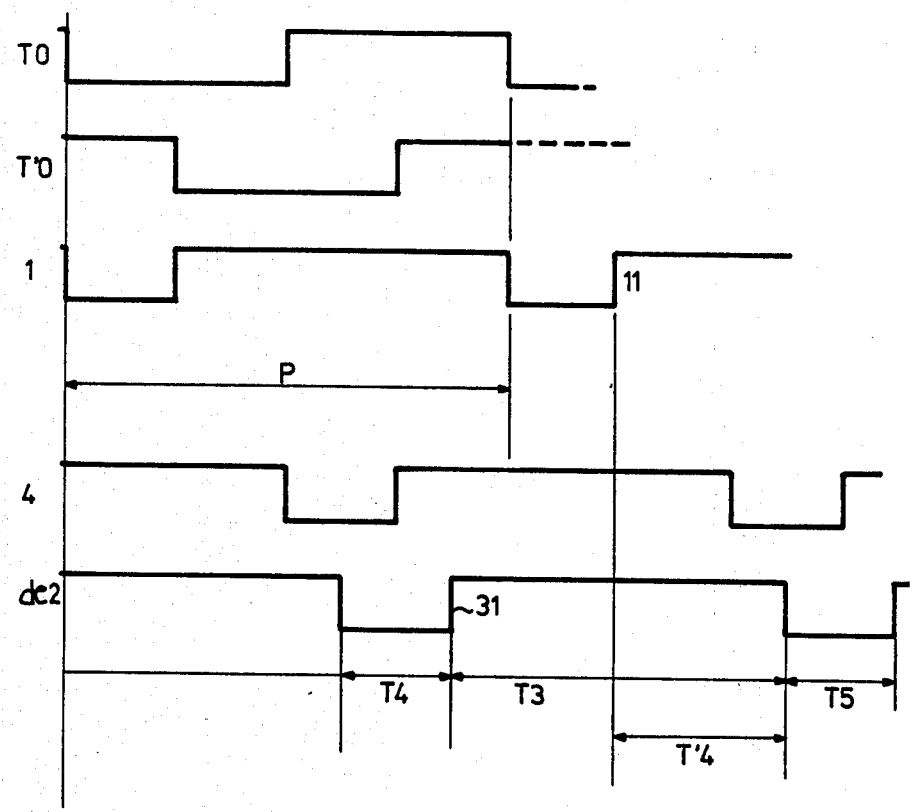
FIG. 8 shows pulses relative to the operation of the receiver of FIG. 3.

Before describing further the operation the filter part F it will be helpful to consider FIGS. 8 and 9 which are relative to the pipe line register RP (e.g. type 74S175) and the accumulator AC respectively. This accumulator is a random access memory (RAM) having 32 memory locations per channel (512 memory locations) and consists for instance of 16 Fairchild type 93425 memories (1 K×1 bit) which are partially used. It thus contains 16 blocks of 32 memory locations each. Each memory location has 16 bits. The words read out are 16 bit words, characterizing a filter output. The addresses (of bits) necessary to address the 512 memory locations are supplied by address counter CO (outputs T1 to T9). The 16 blocks 1 to 16 are represented on the right drawing of FIG. 9. Each block is divided into two parts of 16 memory locations each. Block 1 for instance is divided into parts 1a and 1b and the part 1a is shown on the left drawing of FIG. 9. This part 1a has 16 memory locations each able to store a different complete filter result of the 6 individual filters, characterized by the unit impulse response $C_0^i, \ldots C_{127}^i (i=0$ to 5), two guard filters, characterized by the unit impulse response $(i=6,7)$ and the corresponding Hilbert transformers $H_0^i$, $\ldots H_{127}^i (i=0$ to 7). The above 16 complete filter results are represented in an abbreviated way by the formulas $$y_0 = \sum_0^{127} C_k^j x_{k,0} \text{ (1) and } y'_0 \sum_0^{127} H_k^j x_{k,0} \text{ (2)}$$

shown in part 1a of block 1. It should be noted that although for simplicity reasons FIG. 9 shows complete filter results stored in all locations of the memory CB this cannot be the case simultaneously. Indeed the 16 complete filter results represented by the formulas $$y_{64} = \sum_0^{127} C_k^j x_{k+64,0} \quad (3)$$

$$y'_{64} = \sum_0^{127} H_k^j x_{k+64,0} \quad (4)$$

are only available 64 frame time intervals or 8 milliseconds after that the results $y_0$ and $y'_0$ are available respectively. This is due to the fact that the unit impulse responses are convoluted with the sample sequence $$x_{64,0}, x_{65,0} \ldots, x_{127,0}, (x)_{0,0} \ldots, (x)_{63,0}, (x)_{k,j}$$

having been defined earlier. Generally, a complete result $$y_n = \sum_0^{127} C_k^j x_{k+n,j} = 0 \text{ to } 15$$

is available n frames after the availability of result $y_0$. From the right drawing of FIG. 9 it can be derived that the results from a block are available 4 frame time intervals after those from the previous block and that four frame time intervals after that the results from part 16b of the 16th channel have been made available, the filters results from part 1a (channel 1) are again complete.

As mentioned earlier this staggering of the availability of the results is necessary to allow the microprocessor to evaluate the filter results of the different channels in succession, it being recalled that the microprocessor needs 4 frame time intervals to evaluate a filter result. The microprocessor is a generally known one built around three four bit bipolar microprocessor slices (e.g. type AN2901–Micro Devices).

FIG. 8 shows the following pulses:
TO: clockpulses at output terminal TO of address counter CO (period P: 244 nanoseconds)
T'O: clockpulses TO delayed by 178 period
1 and 4 output pulses at terminals 1 and 4 of demultiplexer DM (FIG. 3) respectively.

de2 pulses delayed by 25 nanoseconds with respect to pulses 4. (Output pulses at output terminals 2 and 3 are not used). Pulses T0 and T'0 are fed to the two address inputs of DM, the one data input being constantly kept low. These address inputs are thus successively fed with the addresses 01, 00, 10, 11 thereby selecting the outputs 1, 2, 4, 3 which are made successively low. Output 4 is connected to the write input WR of AC and to the enabling output E, of RP via delay line DE2, delaying output pulse 4 by 25 nanoseconds. The input WR is active when low. Output 1 of DM is connected to the enabling input E3 of the transparent latch TL. From FIG. 8 it is derived that AC is in the read condition except during the active low time interval (T4). Information which is present at the inputs of the register RP is stored therein and is then available at the output thereof when E1 is triggered with a positive going edge (e.g. 31) of a pulse de2 at the end of the time interval T4. The output of AC is connected to the transparent latch TL (such as the TI type SN74S373) the output of which is connected to the microprocessor PR via a tristate buffer TB (e.g. type SN74LS241) and to the 2-1 data selector S2-1 (e.g. type SN74S257). The other input branch of this data selector is grounded whilst its output is connected to one of the inputs of adder AD2 as shown. Stage SR of RP is connected to the selecting input SE and enabling input E2 of data selector S2-1 and of tristate buffer TB respectively.

It is now supposed that a partial product, say $C_k x_k$ has been stored into RP with a positive going edge e.g. 31 of pulse de2 (FIG. 8) and has been made available at the output of RP and is consequently supplied to AD2. During the time interval T3 the sum of the previous partial products $$\sum_0^{k-1} C_k x_k$$

is read out from AC. The data read out from AC are transmitted via TL and S2-1 to AD2, TL being enabled by means of pulse 11 of pulse train 1 and S2-1 selecting the non-earthed input for reasons explained below. These data are not transmitted to the microprocessor since the tristate buffer TB is blocked. During the time interval T4' the sum $$\sum_0^k C_k x_k$$

is formed in ADD2 and is stored in the appropriate memory location of AC during time interval T5 whereafter this sum is read out again and is added to the next partial product $C_{k+1} x_{k+1}$. When a complete filter result $$\sum_0^{128} C_k x_k$$

has been obtained and read out from AC, it is stored in the transparent latch, the first product $C_0 x'_0$ having been stored into the register RP. For reasons explained below the selector S2-1 then selects the earthed input and the tristate buffer TB is enabled. Consequently, the complete filter result is sent to the microprocessor while an all zero word is transmitted to AD2. This is necessary since only the first partial result $C_0 x'_0$ has to be stored in AC, $x'_0$ being the first following simple of the channel considered. The selector S2-1 selects the earthed input and the tristate buffer TB is enabled when $C_0 x'_0$ is stored into RP due to stage SR of RP being reset to 0, it being recalled that the control bit in the word characterizing the first filter coefficients $C_0$, $H_0$ is set to 0. The control bits associated with the other coefficients are set to 1 and do not influence S2-1 and TB.

Before describing the translator circuit TR in detail reference is made to FIGS. 24 and 25.

In the abbreviated table of FIG. 24 each character represents four boxes on a horizontal line comprised between two double vertical lines shown on FIG. 6. Character B for instance represents the four boxes (60, 124); (61, 125); (62, 126); (63, 127) whilst the character B̄ (called inverted character) represents the four boxes (124, 60); (125, 61); (126, 62); 127, 63). All the boxes of FIG. 6 comprised between two successive vertical double lines have a same blocknumber BLN as shown on FIG. 24.

The following observations are now made:

1. The same characters or their inverted ones appear in the same sequence in each block number BLN (four frames). The characters belonging to a BLN and those belonging to the next following one are staggered by one character.

2. A character situated at the intersection of row CH15 and any column appears inverted in the next following column on row CH0.

3. An inversion takes place by the change from one channel to the next following one when the channel number is larger than the block number and for block numbers up to 15 i.e. during the first 8 milliseconds.

4. For the following block numbers 0 to 15 the same pattern as for the 15 previous block numbers is repeated but all characters are inverted. These observations will be useful when later on the operation of the translator circuit is explained.

The left table of FIG. 25 shows the contents of the coefficient bank CB in an abbreviated way, it being reminded that a block such as (60, 124) for instance represents the memory part as shown on FIG. 7 and wherein the 32 filter-coefficients $C_0^i$, $H_0^i$ and $C_{64}^i$, $H_{64}^i$ (i=0 to 7) are stored. The right table shows the characters representing the boxes on the corresponding horizontal lines.

Figure 26:
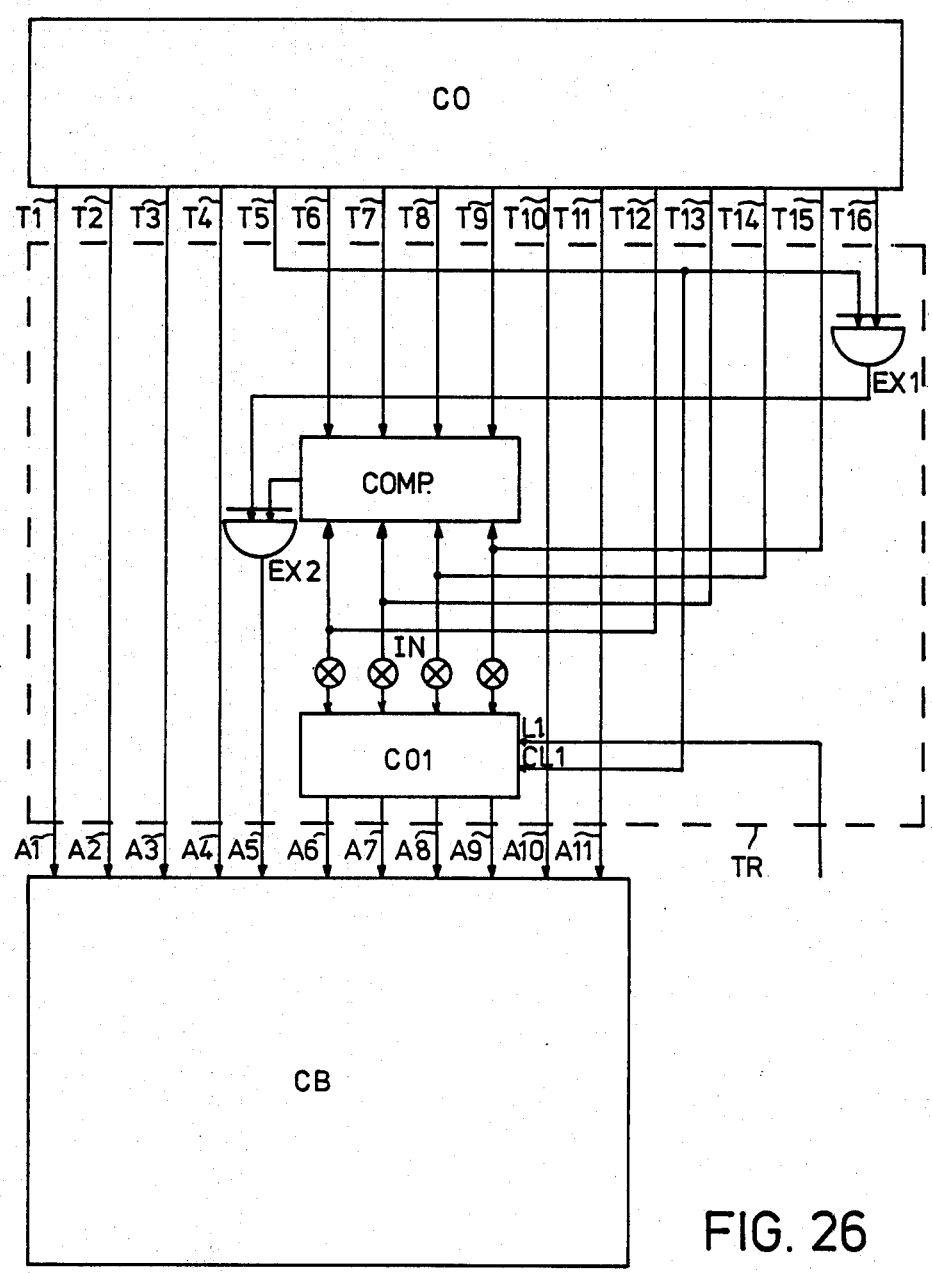
FIG. 26 is a block diagram of the addressing means or translator circuit to address the coefficient bank.

Referring to FIG. 26, the translator circuit TR shown thereon includes a four bit presettable counter C01 (e.g. TI type SN74S163) the outputs of which are connected to the address inputs A6 to A9 of the coefficient bank CB also shown, a comparator COMP to compare output series of T6 to T9 and T12 to T15 of counter CO respectively, an exclusive OR-gate EX1 to compare the output states of T5 and T16 and an exclusive OR-gate EX2 to compare the outputs of EX1 and COMP. The output of EX2 is connected to the address input A5 of CB. The counter C01 further has a load input L1 connected to the processor PR and a clock input CL1 connected to output T5 of C0. The outputs T12 to T15 are connected to the four counter inputs via inverter IN as shown. The address part a1 a2 a3 a4 fed to address inputs A1 A2 A3 A4 respectively select a location of one of the first sixteen (e.g. 0 to 15 FIG. 7) or the second sixteen (e.g. 17 to 32 FIG. 7) locations of a box depending on the value a5=0 or a5=1 of address bit a5 fed to address input A5 respectively. Address bits a6, a7, a8, a9 conveyed to address input A6 to A9 respectively select a group of four boxes out of 16 groups on a horizontal line whilst frame bits a10 and a11 fed to the respective inputs A10 and A11, together with a6 to a9 select a predetermined box.

An address t6 t7 t8 t9 appearing at the outputs T6, T7, T8, T9 of counter C0 respectively corresponds to a predetermined channel, CH0 to CH15. Address bits t12 to t15 appearing at the outputs T12 to T15 of C0 respectively form a BLN address to address the 16 BLN of the first or second series of BLN whilst bit t16 at output T16 decides on whether the first or second series of BLN are taken.

The table herebelow shows the box addresses a6 to a9 and the corresponding BLN addresses t12 to t15, and bit a5 in accordance with the tables shown on FIGS. 6, 24 and 25.

| BLN | t12 | t13 | t14 | t15 | a6 | a7 | a8 | a9 | a5 |
|-----|-----|-----|-----|-----|----|----|----|----|----|
| 0   | 0   | 0   | 0   | 0   | 1  | 1  | 1  | 1  | 0  |
|     |     |     |     |     | 0  | 0  | 0  | 0  | 1  |
|     |     |     |     |     | 0  | 0  | 0  | 1  | 1  |
|     |     |     |     |     | 0  | 0  | 1  | 0  | 1  |
|     |     |     |     |     | .  | .  | .  | .  | .  |
|     |     |     |     |     | 1  | 1  | 1  | 0  | 1  |
| 1   | 0   | 0   | 0   | 1   | 1  | 1  | 1  | 0  | 0  |
|     |     |     |     |     | 1  | 1  | 1  | 1  | 0  |
|     |     |     |     |     | 0  | 0  | 0  | 0  | 1  |
|     |     |     |     |     | .  | .  | .  | .  | .  |
|     |     |     |     |     | 1  | 1  | 0  | 1  | 1  |
| 2   | 0   | 0   | 1   | 0   | 1  | 1  | 0  | 1  | 0  |
|     |     |     |     |     | 1  | 1  | 1  | 0  | 0  |
|     |     |     |     |     | 1  | 1  | 1  | 1  | 0  |
|     |     |     |     |     | 0  | 0  | 0  | 0  | 1  |
|     |     |     |     |     | .  | .  | .  | .  | .  |
|     |     |     |     |     | 1  | 1  | 0  | 0  | 1  |
| 3   | 0   | 0   | 1   | 1   | 1  | 1  | 0  | 0  | 0  |
|     |     |     |     |     | 1  | 1  | 0  | 1  | 0  |
|     |     |     |     |     | 1  | 1  | 1  | 0  | 0  |
|     |     |     |     |     | 1  | 1  | 1  | 1  | 0  |
|     |     |     |     |     | 0  | 0  | 0  | 0  | 1  |
|     |     |     |     |     | .  | .  | .  | .  | .  |
|     |     |     |     |     | 1  | 0  | 1  | 1  | 1  |
|     |     |     |     |     | .  | .  | .  | .  | .  |
| 15  | 1   | 1   | 1   | 1   | 0  | 0  | 0  | 0  | 0  |
|     |     |     |     |     |    |    |    |    | 0  |
|     |     |     |     |     | .  | .  | .  | .  | .  |
|     |     |     |     |     | 1  | 1  | 1  | 1  | 0  |

The counter C01 counts 15 steps (clockperiod 7.8 microseconds) each frame starting from a different address every four frames. These starting addresses are the inversed values of the BLN addresses. Consequently, the counter C01 is loaded every 4×15×7.8 microseconds=0.5 millisecond with the inverse of the address t12 t13 t14 t15 (via inverters IN) the output being connected to the address inputs A6 to A9, and then counts at a rate of 1 per 7.8 microseconds during the four following frames.

The comparator COMP compares the address of each channel CH0 to CH15 to the address of BLN. When the channel number is larger than the block number BLN its output is high. When the channel number is smaller or equal to the BLN its output is 0.

Recalling what has been stated earlier, when the output of COMP is 0 the bit a5 may not change (a5=t5) during the first 8 milliseconds of the total cycle of 16 milliseconds, whilst when the output of COMP is 1 during the above time interval a5 is inverted. During the following 8 milliseconds time interval the situation is reversed (a5=$\overline{t5}$). This is made clear by means of the following table:

| t5 | COMP | t16 | a5 |
|----|------|-----|----|
| 0  | 0    | 0   | 0  |
| 1  | 0    | 0   | 1  |
| 0  | 1    | 0   | 1  |
| 1  | 1    | 0   | 0  |
| 0  | 0    | 1   | 1  |
| 1  | 0    | 1   | 0  |
| 0  | 1    | 1   | 0  |
| 1  | 1    | 1   | 1  |

From the above it clearly follows that a5 is the exclusif OR function of t5, COMP and t16, it being reminded that t16 decides on whether the first or second series of 16 BLN are taken.

In the case of register signalling according to the signalling system No 5 (Specified in the Green Book Volume VI-2, pages 323 to 337, Fifth Plenary Assembly, Geneva 4-15, December 1972, published by the I.T.Y. 1973) a 2-out-of-6 multifrequency code is used and for the normal digit transmission bursts of substantially 55 milliseconds are used. Since this system is not a compelled one it is important to recognise a message within the specified time interval. It is therefore necessary to limit the number of filter coefficients as compared to the compelled case described earlier, in order to limit the recognition time.

In the receiver realized according to the invention only 96 frames and consequently the same number of filter coefficients have been considered in order to obtain a complete filter result. This means that a result is available every 125 microseconds×(96/2)=6 milliseconds when again two filters and their associated Hilbert transforms for the 6 frequencies and the two guard filters are considered per channel the coefficients of the two series of 16 filters being staggered by (96/2)=48 values.

The convolution table shown on FIG. 27 is similar to that of FIG. 6 and shows the multiplication sequences of the succeeding incoming samples and the corresponding filter coefficients during the different frames. The boxes shown in the table of FIG. 27 have the same meaning as those shown on FIG. 6 and reference is made to the explanation given earlier in connection therewith. Each box contains filter coefficients $C_k^i H_k^i$, $C_{k+48}^i H_{k+48}^i$ (i=0 to 7). Since there are per box two series of staggered coefficients as mentioned before the number of boxes per block number BLN is (96/2)=48. The number of frames per block number is thus (48/16)=3 reminding that the number of channels is 16.

The table of FIG. 28 which is similar to that of FIG. 25 shows, in an abbreviated way, the contents of the coefficient bank and reference is made to the explanation given earlier in connection with FIG. 25. It should however be remarked that only 32×16×3=1536 memory locations are needed in CB so that one block of 512 locations is not used in the case of 2048 location memory. The memory CB is read out in a similar way as in the case represented on FIG. 25, i.e. from memory location 511 over location 0 to 510, from location 1023 over location 512 to 1022 and from location 1535 over location 1024 to 1534 during the frames 0 to 2. Then from location 510 to 509, 1022 to 1021 and 1534 to 1533 during frames 3 to 5 etc. Since there are only 3 frames in each block number instead of 4 frames as in the previous case, bits a10, a11 at terminals A10, A11 (FIG. 26) respectively have to be reset after each block. To this end the counter part (T8, T9, T10, T11) of C0 which consists of four 4 bit synchronous counters T0-T3; T4-T7; T8-T11, T12-T15 and a D-flipflop (output T16) as mentioned earlier, is reset after each block number (every succeeding three frames) so that counter part T12, T13, T14, T15 steps one step further. Consequently the counter C01 is then loaded after each group of three frames with the correct binary word.

Finally, it should be remarked that in the receiver adapted to receive signals according to system No 5 the thresholds D1, D2 (FIG. 13) are situated at about −8 and −19 dB respectively.

In the case of push button signalling the receiver must be able to recognize one frequency out of each of two groups of four frequency signals. The four frequencies forming part of the lower group are 697, 770, 852 and 941 Hz and those belonging to the higher group are 1209, 1336, 1477 and 1633 Hz., as specified in the CCITT Recommendations Q23.

Whereas in interregister signalling noise is mostly due to that produced by vibrating contacts such as finders or selector contacts forming part of the established path, in push button signalling noise may be due to human voice which may be introduced via the transmitter during the inter digit time intervals. Such voice signals may cause imitations. The imitation rate is defined as being the rate of imitation (the detection of false digits) detected when 100 hours of speech signals taken from normal telephone conversations are fed to the receiver. Although the receiver must be immune against such voice signals some noise must be tolerated. Indeed, when noise signals other than voice are present during the number selection a noise sensitive receiver will be blocked and will consequently not be able to recognize the dial signals. Also, when noise signals appear during the number selection a recognized digit may be rejected and then recognized again as a new one when the noise signals succeed each other during the digit time interval. Consequently, the receiver must be at the same time noise tolerant and voice immune which are in fact two contradictory conditions.

The noise tolerance is defined as being the signal to noise ratio (in dB and for white noise) for which no falters occur in the sequence of digit recognition by the receiver when a signal which consists of frequency signal bursts of 50 milliseconds time interval on and off accompanied with noise are fed to the receiver during a given period of time. It is evident that the lower is the noise tolerance figure the better is the noise tolerance.

The voice immunity is defined as being the signal to noise ratio (in dB, and for white noise) for which the receiver is blocked (no-digit recognition) when the above signal is fed to the receiver.

It has been found in practice that this voice immunity represents fairly well the quality of the receiver against imitations.

To protect the receiver against noise and voice two floating thresholds are provided in the receivers and each of the eight individual filters are multiband filters as explained below. In the push button receiver the above thresholds are situated at −6 dB and −12 dB.

In principle the push button receiver does not differ from the receivers explained earlier. The filter part includes eight multiplexed multiband FIR filters having 128 coefficients each. The microprocessor groups separately the filter results of the four filters designed for the lower group of frequencies and those of the four filters designed for the higher group. For each of these groups of four results a maximum value is derived and from these maximum values the two threshold values are derived. The filter results of the three remaining filters in each group are compared with the corresponding smallest threshold values and are accepted when their values are smaller. The difference in level between the above mentioned maximum values (Twist) is limited to 6 dB. Therefore, the maximum value of each group is compared with the −6 dB threshold value of the other group and these values are accepted when they are both larger than the −6 dB threshold values of each group. For each channel a complete filter result is available every eight milliseconds and a digit will be validated when this digit is detected after 3 successive test, i.e. after 3×8=24 milliseconds.

Figure 23:
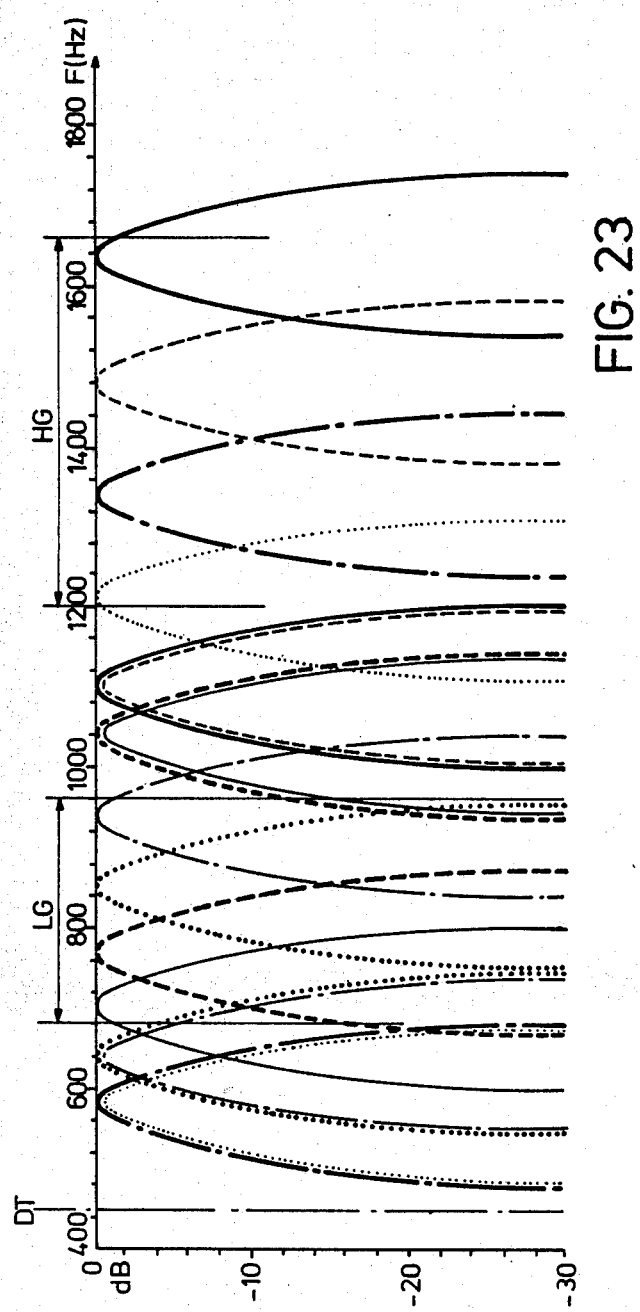

Reference is now made to FIGS. 15 to 22 showing the response curves of the individual filters of the push button receiver and FIG. 23 is a family plot of these response curves. Each of the frequency responses of the individual filters has two pass bands. A first one centered around the nominal frequency and a second one centered around a frequency situated outside the frequency ranges of the lower and higher group. For each nominal frequency the corresponding centre frequency of the second band is shown in the table herebelow.

| LOWER GROUP | | HIGHER GROUP | |
|---|---|---|---|
| Nominal frequency | frequency 2nd band | nominal frequency | frequency 2nd band |
| 697 | 1040 | 1209 | 580 |
| 770 | 1040 | 1336 | 580 |
| 852 | 640 | 1477 | 1100 |
| 941 | 640 | 1633 | 1100 |

It should be noted that the second band centre frequency values are not critical but they are chosen in such a way as to fill up efficiently the frequency gap between the lower and the higher band and the frequency gap below the lower frequency gap, and that two pairs of frequencies of each group correspond with a same second band centre frequency. The reason for this is that when voice signals are present having components in the frequency gap below the lower group or between the two groups the receivers for the low and high group will at least detect a 2-out-of-4 code which is rejected.

In FIG. 23 a family plot is drawn showing the bands centered around the nominal frequencies in the low (LG) and high groups (HG) and in the frequency intervals below lower group and between the lower and the higher group. It has been found that the introduction of the second pass bands improve the voice immunity of the receiver and that the noise tolerance is not influenced in appreciable way.

It should also be remarked that if necessary instead of filters with two pass bands, filters with three pass bands could be designed having a pass band in the frequency region above the higher group.

Finally, although receivers have been described adapted to operate according to signalling specifications such as R2, No 5 etc. the receivers can be adapted to recognize signals according to other specifications such as R1, etc.

While the principles of the invention have been described above in connection with specific apparatus, it is to be clearly understood that this description is made only by way of example and not as a limitation on the scope of the invention.

We claim:

1. Digital signalling system for multifrequency signalling and transmission of signals in digital form in channels grouped in successive frames including sender means which are coupled to receiver means via transmission means and which are adapted to generate at least one frequency signal, said receiver means being adapted to recognize the presence of said frequency signal received and being provided with guard means to protect said receiver means against the reception of spurious signals, the invention wherein said receiver means includes filter means including at least one multiple band digital filter, a number of the bands of the multiple bands filtered being used as guard bands to form said guard means in which said sender means generate combinations of frequency signals out of a plurality of frequency signals and that said receiver means are adapted to recognize the presence of said combinations in which said filter means include a number of first filters at least equal to said plurality of frequency signals, each one of said filters being tuned to a different frequency of said plurality of frequency signals, said filters being single band or multiband filters, and wherein when said first filters are tuned to said plurality of frequency signals they are single band filters, said number of first filters also include at least one multiband guard filter, each pass band of which is situated between two different succeeding frequencies of said plurality of frequency signals.

2. Digital signalling system, according to claim 1, wherein said number of first filters includes two interleaved multiband guard filters.

3. Digital signalling system for multifrequency signalling and transmission of signals in digital form in channels grouped in successive frames including sender means, which are coupled to receiver means via transmission means and which are adapted to generate at least one frequency signal, said receiver means being adapted to recognize the presence of said frequency signal received and being provided with guard means to protect said receiver means against the reception of spurious signals, the invention wherein said receiver means includes filter means including at least one multiple band digital filter, a number of the bands of the multiple bands filtered being used as guard bands to form said guard means in which said sender means are adapted to generate combinations of frequency signals out of a plurality of frequency signals and that said receiver means are adapted to recognize the presence of said combinations in which said filter means include a number of first filters at least equal to said plurality of frequency signals, each one of said filters being tuned to a different frequency of said plurality of frequency signals said filters being single band or multiband filters and wherein said first filters are all multiband filters having a passband centered around a different one of said frequencies of said plurality of frequency signals and a guard band situated between two succeeding frequencies of said plurality.

4. Digital signalling system according to claim 3, wherein said guard bands are situated between two succeeding or preceeding frequencies next to said one frequency.

5. Digital signalling system according to claim 1, wherein each of said first are further constituted by a second and a third filter, the impulse response of one of which being the Hilbert transformer of the other one.

6. Digital signalling system according to claim 5, wherein said filters are finite duration impulse response filters (FIR).

7. Digital signalling system according to claim 6, wherein said filters have all a same number N of filter coefficients.

8. Digital signalling system, according to claim 7, wherein $N=128$.

9. Digital signalling system, according to claim 7, wherein each of said filters give a complete output result when a same number N of input samples derived from said combination of received frequency signals have been received by each filter.

10. Digital signalling system according to claim 9, wherein each of said second and third filters are twin filters, said output results of said twin filters for each channel being shifted with respect to one another by a predetermined number of frames.

11. Digital signalling system according to claim 10, wherein said output results are shifted by (N/2) frames.

12. Digital signalling system according to claim 1, wherein said filter means include a memory (CB) to store binary values of filter-coefficients for each of said first filters.

13. Digital signalling system according to claim 12, wherein said memory has $N \times I$ memory locations, I being the number of said second and third filters.

14. Digital signalling system according to claim 13, wherein $N=128$ $I=16$ ($N \times I=2048$).

15. Digital signalling system according to claim 1, wherein said receiver means are able to receive a combination of two frequencies each out of a different group of four frequencies, each filter having a passband centered around a different one of said frequencies of said two groups and a passband situated outside the frequency band determined by said two groups of frequencies.

16. Digital signalling system according to claim 1, wherein said sender means are multichannel sender means, said receiver means being provided in time multiplex for a plurality of channels said filters of said receiver means being multiplexed filters.

17. Digital signalling system according to claim 16 wherein said output results of said filters for two immediately succeeding channels are shifted with respect to one another by a second predetermined number of frames.

18. Digital signalling system according to claim 16 wherein said memory (CB) is divided into N/2 boxes each having 2I memory locations, a predetermined box including I/2 first predetermined homologue filter coefficients and I/2 second homologue filter coefficients belonging to said twin filters constituting said I second filters, and I/2 third and I/2 fourth predetermined homologue filter coefficients belonging to said twin filters constituting said I third filters, said first and second, third and fourth homologue filter coefficients being separated in each box by a constant number of successive filter coefficients of said impulse response sequence equal to one less than said first predetermined number.

19. Digital signalling system according to claim 18, wherein the predetermined number is (N/2) −1.

20. Digital signalling system according to claim 18, wherein a filter coefficient value stored in a location of a said box and a filter coefficient stored in a homologue location of an adjacent box is separated by a second constant number of successive filter coefficients of said impulse response sequence in each of the (N/2×L) groups of succeeding boxes having their boxes starting with first, second third . . . filter coefficients, L being the number of channels handled by said multiplexed filter means, said second constant number being one less than said second predetermined number of frames.

21. Digital signalling system according to claim 20, wherein (N/2L)=4 and that said second constant number is 3.

22. Digital signalling system according to claim 16 further including an accumulator (AC) to store for each channel and for each of said twin filters uncompleted or completed filter results.

23. Digital signalling system according to claim 22 wherein said accumulator has 2 blocks of 2I memory locations, L being the number of channels handled by said multiplexed filter means the first and second I locations of said 2I locations of each block being reserved to store the uncomplete or complete filter results of said second and third filters respectively.

24. Digital signalling system according to claim 22, wherein the word characterizing the last of said N filter coefficients includes a special bit which indicates that a complete filter result is available at the output of said accumulator when all coefficients have been used.

25. Digital signalling system according to claim 23 further including a micro-processor (PR, M, MO) to further process said complete filter results read out from said accumulator.

26. Digital signalling system according to claim 25, wherein said micro-processor is able to process said filter results of each of said second and third filters for each of said plurality of frequency signals for each channel, more particularly it is able:
1. to derive phase independent values from each said filter results of said second and third filter,
2. to determine the largest value of 1,
3. to derive two threshold values from 2,
4. to compare the phase independent values with the threshold values and accept values when they satisfy predetermined criteria,
5. to perform a n-out-of-m test one of the accepted values,
6. to perform a timing test,
7. to lock said receiver means when a signal has satisfied the predetermined criteria, and
8. to compare the phase independent values with a fixed threshold once the receiver means has being locked and to release it when said values are below said fixed threshold.

27. Digital signalling system for multifrequency signalling and transmission of signals in digital form in channels grouped in successive frames including sender means, which are coupled to receiver means via transmission means and which are adapted to generate at least one frequency signal, said receiver means being adapted to recognize the presence of said frequency signal received and being provided with guard means to protect said receiver means against the reception of spurious signals, the invention wherein said receiver means includes filter means including at least one multiple band digital filter, a number of bands of the multiple bands filtered being used as guard bands to form said guard means and wherein said filter means includes storage means and converting means to store coded logarithmic values of filter parameters and to convert code samples of said frequency signal into pure logarithmic values, respectively.

28. Digital signalling system according to claim 27, wherein said converting means (ME1) is a memory means, e.g. a Read-Only Memory, to store said pure logarithmic values and that the converting means further includes an input register (RO) to successively store said coded input sample values and an adder (AD1) to successively add said logarithmic values of said filter parameters read out from said storage means (CB) and said pure logarithmic values read out from said memory means, which is coupled between said input register and said adder.

29. Digital signalling system according to claim 28, wherein each of said pure logarithmic values are stored in a different location of said memory means (ME1) at an address equal to the corresponding coded input sample value.

30. Digital signalling system according to claim 29, wherein both said logarithmic values stored in said memory means and said storage means are defined by a logarithmic function having a same base.

31. Digital signalling system according to claim 30, wherein said base is equal to 256.

32. Digital signalling system according to claim 31, said logarithmic function is $$y = 128 \log_{256} 256^2 w$$

wherein w is the normalized linear values of said filter parameters or of the linear values of said input samples.

33. Digital signalling system according to claim 28, wherein said digital filter further includes a second memory means (ME2) storing in each location the linear value of the corresponding location address which is the coded logarithmic value obtained at the output of said adder (AD1), a second register (RP) to temporarily store said linear values read out from said third memory.

34. Digital signalling system according to claim 33, wherein said digital filter further includes an accumulator (AC) to store uncompleted or completed filter results, a second adder (AD2) to add said uncomplete filter results with the corresponding values read out from said second register.

35. A receiver for a multifrequency signalling system, said receiver being adapted to recognize the presence of a plurality of transmitted frequency signals received and being provided with guard means to protect said receiver against the reception of spurious signals, the invention wherein said receiver includes filter means including at least one multiple band digital filter, a number of the bands of the multiple bands filtered being used as guard bands forming said guard means in which said filter means include a number of filters at least equal to said plurality of transmitted frequency signals, each one of said filters being tuned to a different frequency of said plurality of frequency signals, said filters being single band or multiband filters and wherein when said filters are tuned to said plurality of frequency signals they are single band filters, said number of filters also includes at least one multiband guard filter, each pass band of which is situated between two different succeeding frequencies of said plurality of frequency signals.

* * * * *